US012779648B2

(12) United States Patent
Cooper et al.

(10) Patent No.: US 12,779,648 B2
(45) Date of Patent: Nov. 3, 2026

(54) IMPACT TOOLS WITH RIGIDLY COUPLED IMPACT MECHANISMS

(71) Applicant: Ingersoll-Rand Industrial U.S., Inc., Davidson, NC (US)

(72) Inventors: Timothy R. Cooper, Titusville, NJ (US); John J. Linehan, Jamison, PA (US); Edward Charles Eardley, Easton, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 105 days.

(21) Appl. No.: 18/422,519

(22) Filed: Jan. 25, 2024

(65) Prior Publication Data

US 2024/0157532 A1 May 16, 2024

Related U.S. Application Data

(60) Continuation of application No. 17/672,085, filed on Feb. 15, 2022, now Pat. No. 11,911,887, which is a
(Continued)

(51) Int. Cl.
*B25B 21/02* (2006.01)
*B25D 11/06* (2006.01)
(Continued)

(52) U.S. Cl.
CPC .......... *B25D 11/068* (2013.01); *B25D 11/106* (2013.01); *B25D 17/06* (2013.01);
(Continued)

(58) Field of Classification Search
CPC ... B25D 11/062; B25D 11/106; B25D 11/068; B25D 17/06; B25D 2250/221;
(Continued)

(56) References Cited

U.S. PATENT DOCUMENTS 3,661,217 A * 5/1972 Maurer ................. B25B 21/026 173/93.5
4,287,956 A * 9/1981 Maurer ................. B25B 21/026 173/93.5
(Continued)

FOREIGN PATENT DOCUMENTS

EP 1918071 A2 5/2008
EP 3031580 A1 6/2016
WO WO-8908941 A1 * 9/1989 ........... H02K 1/2773

OTHER PUBLICATIONS

European Patent Office, European Examination Report in corresponding application No. 19170437.8, dated May 10, 2021, 5 pp.
(Continued)

*Primary Examiner* — Andrew M Tecco
(74) *Attorney, Agent, or Firm* — Kevin E. West; Advent, LLP

(57) ABSTRACT

Illustrative embodiments of impact tools with impact mechanisms rigidly coupled to electric motors are disclosed. In at least one illustrative embodiment, an impact tool may comprise an impact mechanism, an electric motor, and a control circuit. The impact mechanism may comprise a hammer and an anvil, the hammer being configured to rotate about a first axis and to periodically impact the anvil to drive rotation of the anvil about the first axis. The electric motor may comprise a rotor that is rigidly coupled to the impact mechanism, the electric motor being configured to drive rotation of the hammer about the first axis. The control circuit may be configured to supply a current to the electric motor and to prevent the current from exceeding a threshold in response to the hammer impacting the anvil.

18 Claims, 14 Drawing Sheets

Related U.S. Application Data division of application No. 15/958,046, filed on Apr. 20, 2018, now Pat. No. 11,247,321.

(51) Int. Cl.
*B25D 11/10* (2006.01)
*B25D 17/06* (2006.01)

(52) U.S. Cl.
CPC ......... *B25B 21/02* (2013.01); *B25D 2211/062* (2013.01); *B25D 2250/095* (2013.01); *B25D 2250/195* (2013.01); *B25D 2250/221* (2013.01)

(58) Field of Classification Search
CPC . B25D 2250/195; B25B 21/02; B25B 21/026; H02K 1/28
See application file for complete search history.

(56) References Cited

U.S. PATENT DOCUMENTS

| | | | | |
|---|---|---|---|---|
| 4,987,330 | A * | 1/1991 | Murphy | H02K 1/28 310/216.123 |
| 5,906,244 | A * | 5/1999 | Thompson | B25B 21/026 173/93.5 |
| 6,491,111 | B1 * | 12/2002 | Livingston | B25B 21/02 173/93.5 |
| 6,727,618 | B1 * | 4/2004 | Morrison | H02K 19/103 310/90.5 |
| 6,889,778 | B2 * | 5/2005 | Colangelo, III | B25B 21/02 173/93.5 |
| 6,891,299 | B2 * | 5/2005 | Coupart | H02K 1/185 310/156.43 |
| 7,002,276 | B2 * | 2/2006 | Evans | H02K 1/276 310/156.01 |
| 8,020,630 | B2 * | 9/2011 | Amend | B25B 21/02 173/1 |
| 8,813,866 | B2 * | 8/2014 | Suzuki | H02M 1/10 173/2 |
| 11,247,321 | B2 | 2/2022 | Cooper et al. | |
| 2008/0099217 | A1 * | 5/2008 | Seith | B25B 21/026 173/1 |
| 2008/0173458 | A1 * | 7/2008 | Seith | B25B 21/026 173/176 |
| 2011/0315417 | A1 * | 12/2011 | Matsunaga | B25B 21/008 173/176 |
| 2012/0279736 | A1 * | 11/2012 | Tanimoto | B25B 21/026 173/117 |
| 2013/0234557 | A1 * | 9/2013 | Kobayashi | H02K 1/28 310/216.123 |
| 2014/0365012 | A1 * | 12/2014 | Chen | B25B 21/02 81/464 |
| 2015/0231769 | A1 * | 8/2015 | Golden | B25B 21/026 173/93 |
| 2015/0336249 | A1 * | 11/2015 | Iwata | B25B 21/026 173/1 |
| 2016/0354905 | A1 * | 12/2016 | Ely | B25B 21/008 |

OTHER PUBLICATIONS

European Patent Office, Extended European Search Report in corresponding application No. 19170437.8, dated Jan. 21, 2020, 8 pp.
Office Action for Chinese Application No. 2019103165210, dated Feb. 14, 2022.
Office Action in Europe for Application No. 19170437.8, dated Oct. 27, 2022.

* cited by examiner

IMPACT TOOLS WITH RIGIDLY COUPLED IMPACT MECHANISMS

CROSS REFERENCE TO RELATED APPLICATIONS

The present application is a continuation of U.S. patent application Ser. No. 17/672,085, filed Feb. 15, 2022, and titled “IMPACT TOOLS WITH RIGIDLY COUPLED IMPACT MECHANISMS”, which is a divisional under 35 U.S.C. § 120 of U.S. patent application Ser. No. 15/958,046, now U.S. Pat. No. 11,247,321, filed Apr. 20, 2018, and titled “IMPACT TOOLS WITH RIGIDLY COUPLED IMPACT MECHANISMS.” U.S. patent application Ser. No. 17/672,085 and U.S. patent application Ser. No. 15/958,046 are herein incorporated by reference in their entireties.

TECHNICAL FIELD AND SUMMARY

The present disclosure relates, generally, to impact tools and, more particularly, to impact tools having impact mechanisms rigidly or directly coupled to electric motors.

An impact tool (e.g., an impact wrench) is an automatic socket wrench that generates higher torque at its output than generated by its power means. Typically, a hammer is rotated about an axis via the power means. The hammer builds up energy in the form of a flywheel as it is accelerated to a high speed by the power means. As the hammer spins about its axis, it may also pivot or move laterally along the axis until it strikes an anvil. The anvil is attached to an appropriate output structure configured or adapted to rotate a fastener. In other words, the impact mechanism converts torque, provided by the motor, into a series of powerful rotary blows directed from the hammer to the anvil to rotationally drive a fastener. Such impact tools are designed to apply high torque fastening means in manufacturing and automotive repair environments, just to name a few.

Typical power means for such impact tools include compressed air or electric power. Compressed air has the advantage of supplying sufficient power to a simple hammer/anvil impact mechanism to drive the fastener. Compressed air power, however, requires a supply line from a compressed air source in order to actuate the tool. Such tethering limits the tool’s operability range to only the length of the power supply line.

Alternatively, electric motors may be employed to rotate the hammer. Battery-operated motors, in particular, allow for literally unlimited range to operate the impact tool. This creates a substantial advantage over the compressed air motor in certain circumstances. Because of the constant impact and rebounding inherent in the impact mechanism, gearing and alternative hammer/anvil mechanisms needed to be used. This is to prevent the electric motor from being adversely affected during the impact tool’s operation.

An air powered impact tool most often has a rigid direct connection between its air motor and impact mechanism. Here, there is a single shared degree of freedom between the rotor and the impact mechanism. They move together angularly, hence this single angular movement is shared by both structures. In other words, the air motor rotates in either direction concurrent with the rotation of the hammer. If the hammer rotates clockwise, so too does the air motor’s rotor. Conversely, if the hammer moves counterclockwise (such as rebounding from striking an anvil), so too does the air motor. Because it is only air that supplies the motive force through the motor, rotating the air motor’s rotor in one direction or the other will not harm it.

Electrically powered impact tools, however, have required a compliant connection between the electric motor and impact mechanism. When the hammer stops and/or rebounds in response to striking the anvil, the electric motor’s rotor will not stop or be caused to immediately reverse direction. Compliant mechanisms include the hammer and anvil having a ball and cam mechanism which is known in the art. A ball and cam mechanism allows for two degrees of freedom, first is the angle of the rotor on the electric motor, and second is the angle of the hammer from the impact mechanism. Being compliant, the motor can move in one angular direction (i.e., rotate about its axis in one direction) while the hammer may independently rotate in an opposite direction. Such mechanism is employed so the motor’s rotor will not stop rotating or be forced to reverse direction upon impact between the hammer and anvil.

Without this ball/cam or gearing, i.e., compliant mechanisms, electric motors are believed to have limited use on impact tools. This is because an electric motor can be damaged if its rotor is forced to suddenly stop, substantially decelerate or reverse direction. These circumstances create a high propensity for a current impulse. Motors and associated electronic components typically cannot withstand such impulses. The motors and/or associated electronic components can overheat and fail. These motors have the compliant connection between the motor and impact mechanism so that even when an impact occurs between the hammer and anvil, the rotor in the electric motor continues to rotate in the same direction. Under normal operation, if the motor continues rotating despite an impact between the hammer and anvil, there is little danger to the motor or electrically coupled components being exposed to a current impulse. The compliant mechanism allows to motor to experience essentially a constant load.

An explanation for this is that when an electric motor rotates, it generates a back electromagnetic force (EMF) voltage. Back EMF is a counter-electromotive force that is generated by the spinning rotor. The back EMF is acting opposite against the potential that is being provided. Only the difference in applied potential and the countering back EMF is driving current through the circuit to the motor. The modest difference in potential provides little danger of excessive current being supplied to the motor. Upon a sudden stop or direction reversal forced on the rotor, the motor’s electromagnetic field may collapse or change direction. At this point, there is no longer any back EMF to act against the voltage being applied to the motor. In essence, an unobstructed runway is created between the power source and the motor. This permits an excessive amount of current to be delivered to the motor, thus creating the large current impulse. This occurs very quickly causing substantial heat, and thus damage not only to the motor, but also any associated electronic components such as power switches, flywheel diodes or capacitors. Such impulses under these circumstances are difficult to protect against due to their speed and magnitude.

Hence, because a rigid or direct coupling between an air motor and impact mechanism means that the rotor will rotate back and forth with the rotation of the hammer, those mechanisms are not believed suitable for an electric motor. Compliant coupling means that it allows the electric motor’s rotor to continue rotating in the same direction, regardless of the changing the direction by the moving hammer.

That said, all of the gearing, clutches, and impact mechanism configurations employed in compliant coupling schemes add size and cost to the impact tool. Direct coupling mechanisms are much simpler and less expensive than their compliant coupling counterparts. In addition, stopping the whole power train, for a given impact velocity, will provide more torque than stopping only the mechanism and not the motor. It would, therefore, be beneficial if an electric motor-driven impact tool were able to employ rigid or direct coupled impact mechanisms between the rotor and output drive without risk of the motor and/or associated electronic components being damaged by current impulses.

Accordingly, an illustrative embodiment of the present disclosure provides an impact tool assembly which comprises: an impact mechanism that includes a hammer and an anvil, the hammer being configured to rotate about a first axis and to periodically impact the anvil to drive rotation of the anvil about the first axis; an electric motor comprising a rotor that is directly coupled to the impact mechanism, the electric motor being configured to drive rotation of the hammer about the first axis; wherein the motor rotates the hammer in a first direction, and the hammer causes the rotor to periodically stop rotating in the first direction when the hammer periodically impacts the anvil; and a control circuit that supplies a current to the electric motor and limits the current supplied to the electric motor.

In the above and other embodiments, the impact tool assembly may further comprise: the control circuit which limits the current supplied to the electric motor by disabling the supply of current when the current exceeds a threshold, typically when the hammer impacts the anvil; the control circuit includes a pulse width modulation circuit, that modulates the potential applied to the motor, a current measurement circuit, that measures the current, and disable logic that disables the supply of current to the electric motor for each successive PWM cycle the current exceeds a specified threshold for the electric motor; the control circuit dictates a current limit for the electric motor; the control circuit comprises an electronic controller to prevent the current from exceeding the threshold in response to a high bandwidth measurement of motor current; the control circuit comprises an electronic controller to determine a desired parameter of the impact mechanism and to adjust the threshold to a level associated with achieving the desired parameter of the impact mechanism; the desired parameter is at least one of a rotational speed achieved by the hammer, a torque delivered by the hammer to the anvil upon impact, a rebound angle of the hammer after impacting the anvil, or a frequency at which the hammer impacts the anvil; the hammer is directly coupled to the rotor for rotation about the first axis and the hammer comprises a hammer jaw configured to translate parallel to the first axis between a disengaged position and an engaged position such that the hammer jaw impacts the anvil when in the engaged position; the impact mechanism further comprises a hammer frame supporting the hammer for rotation about the first axis, the hammer being pivotably coupled to the hammer frame such that the hammer is further configured to pivot about a second axis different from the first axis; the hammer frame is directly coupled to the rotor by a connection selected from the group consisting of a splined connection between the hammer frame and the rotor, and the hammer frame and the rotor integrally formed as a monolithic component; a camming plate configured to drive rotation of the hammer about the first axis, the camming plate being rigidly coupled to the rotor by a splined connection between the camming plate and the rotor; and a camming plate configured to drive rotation of the hammer about the first axis, the camming plate and the rotor being integrally formed as a monolithic component.

Another illustrative embodiment of the present disclosure provides an impact tool assembly which comprises: a swinging weight impact mechanism comprising a hammer frame supporting a hammer that rotates about a first axis, the hammer being pivotably coupled to the hammer frame such that the hammer is also configured to pivot about a second axis different from the first axis, and an anvil configured to rotate about the first axis when impacted by the hammer; and an electric motor comprising a rotor that is directly coupled to the swinging weight impact mechanism, the electric motor being configured to drive rotation of the hammer about the first axis in a first direction; wherein the rotor is directly coupled to the swinging weight impact mechanism such that rotation of the rotor in the first direction rotates the hammer in the first direction, and when the hammer stops rotating in the first direction the rotor is concurrently stopped rotating in the first direction.

In the above and other embodiments, the impact tool assembly may further comprise: the hammer frame is directly coupled to the rotor by a connection selected from the group consisting of a splined connection between the hammer frame and the rotor, and the hammer frame and the rotor integrally formed as a monolithic component; the swinging weight impact mechanism further comprises a camming plate configured to drive rotation of the hammer about the first axis, the camming plate being rigidly coupled to the rotor by a splined connection between the camming plate and the rotor; and the swinging weight impact mechanism further comprises a camming plate to drive rotation of the hammer about the first axis, the camming plate and the rotor being integrally formed as a monolithic component.

Another illustrative embodiment of the present disclosure provides an impact tool assembly which comprises: an electric motor comprising a rotor configured to rotate about a first axis; and an impact mechanism comprising a hammer configured to rotate about the first axis and an anvil configured to rotate about the first axis when impacted by the hammer; wherein the hammer comprises a hammer base directly coupled to the rotor for rotation about the first axis and a hammer jaw configured to translate parallel to the first axis between a disengaged position and an engaged position in response to rotation of the hammer base about the first axis such that the hammer jaw rotates about the first axis without impacting the anvil when in the disengaged position and impacts the anvil when in the engaged position; wherein the rotor is directly coupled to the hammer base such that rotation of the rotor in a first direction about the first axis rotates the hammer in the first direction about the first axis, and when the hammer stops rotating in the first direction about the first axis, the rotor is concurrently stopped rotating in the first direction about the first axis.

In the above and other embodiments, the impact tool assembly may further comprise: the hammer base and the hammer jaw are integrally formed as a monolithic component; the hammer further comprises a pin supported by the hammer base and configured to translate parallel to the first axis in response to rotation of the hammer base about the first axis, the hammer jaw being formed on the pin; and a control circuit that supplies a current to the electric motor and limits the current supplied to the electric motor in response to the hammer impacting the anvil.

Additional features and advantages of the rigid or direct coupling electric impact tool assembly will become apparent to those skilled in the art upon consideration of the following detailed descriptions exemplifying the best mode of carrying out the rigid or direct coupling electric impact tool assembly as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific exemplary embodiments thereof have been shown by way of example in the figures and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 1:
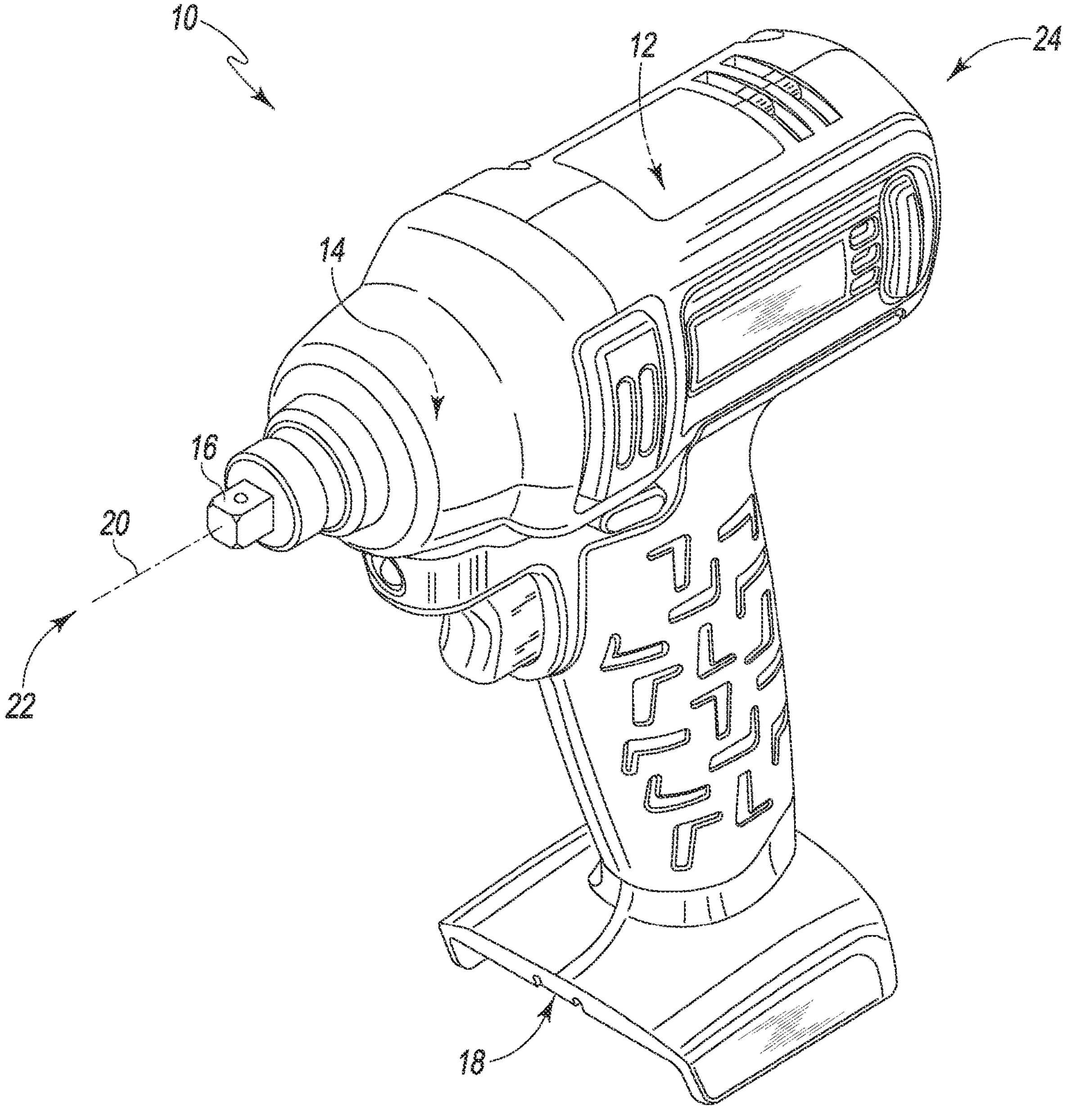
FIG. 1 is a perspective view of an illustrative embodiment of an impact tool including an impact mechanism rigidly coupled to an electric motor.

Referring now to FIG. 1, an impact tool 10 generally includes an electric motor 12 and an impact mechanism 14 configured to convert torque provided by electric motor 12 into a series of powerful rotary blows directed from one or more hammers of impact mechanism 14 to one or more anvils of impact mechanism 14. That is, electric motor 12 is configured to drive rotation of impact mechanism 14 and thereby drive rotation of an output drive 16. In the illustrative embodiment, electric motor 12 is embodied as an electrically powered motor coupled to an energy source 34 (i.e., a source of electricity). As shown in the illustrative embodiment, impact tool 10 includes a receiver 18 configured to receive a battery (e.g., a rechargeable battery) by which electric motor 12 can be powered. However, in other embodiments, electric motor 12 may be configured to be powered by any suitable energy source 34 including, for example, mains electricity (e.g., via a corded connection).

As further shown in FIG. 1, axis 20 may extend from a front output end 22 of impact tool 10 to a rear end 24 of impact tool 10. Depending on the particular embodiment, electric motor 12 and/or one or more components of impact mechanism 14 (e.g., hammer 102, hammer frame 106, camming plate 150, and/or other components described below) may be configured to rotate about output axis 20, an axis parallel to output axis 20, and/or an axis transverse to output axis 20. For example, in some embodiments, the rotational axis of a rotor 26 (see FIG. 2) of electric motor 12, may be coincident with or parallel to output axis 20. In other embodiments, the rotational axis of rotor 26 may be transverse (e.g., at a right angle) to output axis 20. In other words, although impact tool 10 is illustratively shown as a pistol-type impact tool 10, it is contemplated that impact mechanisms of the present disclosure may be used in any suitable impact tool (e.g., an impact tool with a right-angle or other configuration).

Unlike conventional electric impact tools, however, impact tool 10 is intended to be rigidly or directly coupled to its impact mechanism 14. In other words, rotor 26 (see FIG. 2) in electric motor 12, and impact mechanism 14, are adapted to rotate output drive 16 concurrently in both clockwise and counterclockwise directions about output axis 20. For purposes of this disclosure, directly coupled includes, but is not limited to, both rotor 26 and impact mechanism 14 (see FIG. 2) rotating together at the same time. If the impact mechanism rotates clockwise, the rotor rotates clockwise. Conversely, however, when the impact mechanism rotates counterclockwise (e.g., when the hammer rebounds from an impact with the anvil), it causes the rotor to rotate counterclockwise as well. This is in contrast to conventional electric impact tools that require a compliant coupling between the rotor and the impact mechanism. For purposes of this disclosure, compliant coupling includes, but is not limited to, a rotor from an electric motor always rotating in the same direction despite the impact mechanism rotating in an opposite direction. For example, for conventional impact tools, the rotor of an electric motor will always rotate in an illustratively clockwise direction despite the impact mechanism intermittently (e.g., when the hammer rebounds from an impact with the anvil) rotating in a counterclockwise direction. The illustrative embodiments of this present disclosure are directed to the rigid or direct coupling of the electric motor's rotor in an impact tool rather than the compliant coupling.

Because of the direct coupling between rotor 26 and impact mechanism 14, impact tool 10 may now employ impact mechanisms that are traditionally limited for use in air motor-driven impact tools. As described in detail herein, impact mechanism 14, of impact tool 10, may be embodied as a "swinging weight" type impact mechanism, "pin-style" type impact mechanism, "ski jump" type impact mechanism, or other similar-type traditionally air impact mechanism. It is appreciated that these impact mechanisms rely on a direct connection with the rotor, and, thus, traditionally not employed in an electric motor-type impact tool. In the swinging weight impact mechanism, one or more hammers of impact mechanism 14 rotate about one axis (e.g., axis 20 shown in FIG. 1) while also pivoting about another axis (different from the axis of rotation) to deliver periodic impact blow to anvil 104 of impact mechanism 14. For example, in some embodiments, impact mechanism 14 may be similar, in certain respects, to one or more of a Maurer-type impact mechanism, a "rocking dog" type impact mechanism, and an "impact-jaw-trails-the-pivot-pin" type impact mechanism, illustrative embodiments of which are disclosed in U.S. Pat. Nos. 2,580,631; 3,661,217; 4,287,956; 5,906,244; 6,491,111; 6,889,778; and 8,020,630 (the entire disclosures of which are incorporated by reference herein). Similarly, illustrative embodiments of "pin-style" and "ski jump" type impact mechanisms that are known in the art. Again, these impact mechanisms are traditionally used in air motor impact tools. But because rotor 26 of the present disclosure is directly coupled to impact mechanism 14, despite being used with an electric motor, for reasons further discussed herein, these impact mechanisms can be used with this impact tool.

It is further appreciated that in some embodiments, with respect to direct coupling, anvil 104 of impact mechanism 14 may be integrally formed with output drive 16. In other embodiments, anvil 104 and output drive 16 may be formed separately and coupled to one another, such that output drive 16 is configured to rotate as a result of rotation of anvil 104. Output drive 16 is configured to mate with one of a plurality of interchangeable sockets (e.g., for use in tightening and loosening fasteners, such as nuts and bolts). Although output drive 16 is illustratively shown as a square drive, the principles of the present disclosure may be applied to an output drive 16 of any suitable size and shape.

Figure 2:
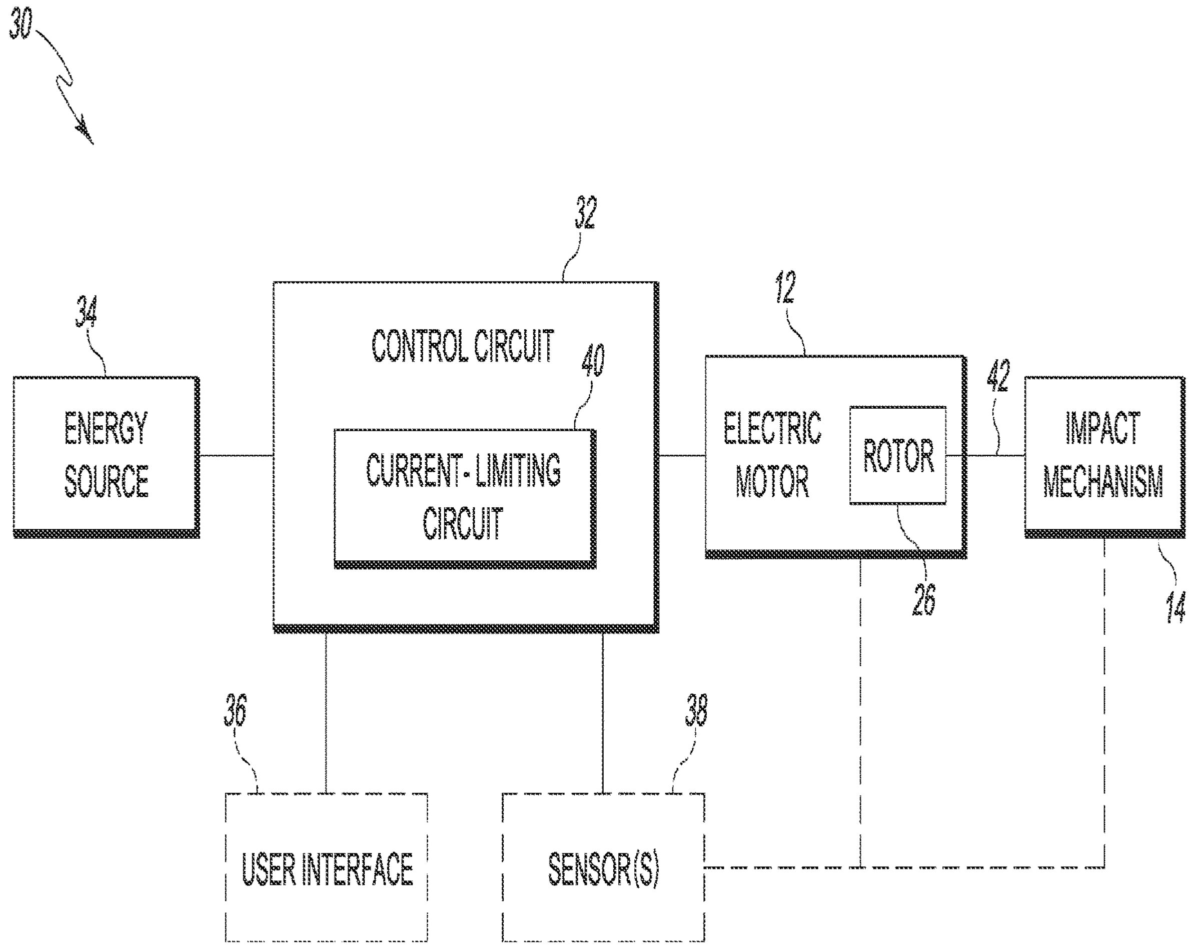
FIG. 2 is a simplified block diagram of an illustrative embodiment of a control system of the impact tool of FIG. 1.

In the illustrative embodiment, impact mechanism 14 is directly driven by electric motor 12. In particular, rotor 26 of electric motor 12 is rigidly coupled to one or more components of impact mechanism 14 (e.g., a hammer 102, hammer frame 106, camming plate 150, etc., as illustratively shown in FIGS. 7A and 7B). As depicted in the diagram of FIG. 2, impact mechanism 14 is rigidly coupled to rotor 26 by a rigid coupling 42. For example, in some embodiments, impact mechanism 14 may be rigidly coupled to rotor 26 by a splined connection, keyed connection, D connection, rectangular connection, or other non-compliant direct connection between impact mechanism 14 and rotor 26 of electric motor 12 (i.e., a rigid coupling 42). Rigid coupling 42 may be formed such that there is little or no "give" or freedom of movement between the rigidly coupled components (e.g., rotor 26 and mechanism 14). For example, in the illustrative embodiment, there are no ball-and-cam mechanisms, springs, or other compliant mechanisms to absorb energy for rotor 26 or otherwise prevent rotor 26 from rebounding during rebound of hammer 102. In other embodiments, rotor 26 may be integrally and monolithically formed with a component of impact mechanism 14 (e.g., a hammer 102, hammer frame 106, camming plate 150, etc.), thereby constituting a rigid coupling 42 between electric motor 12 and impact mechanism 14.

Figure 11:
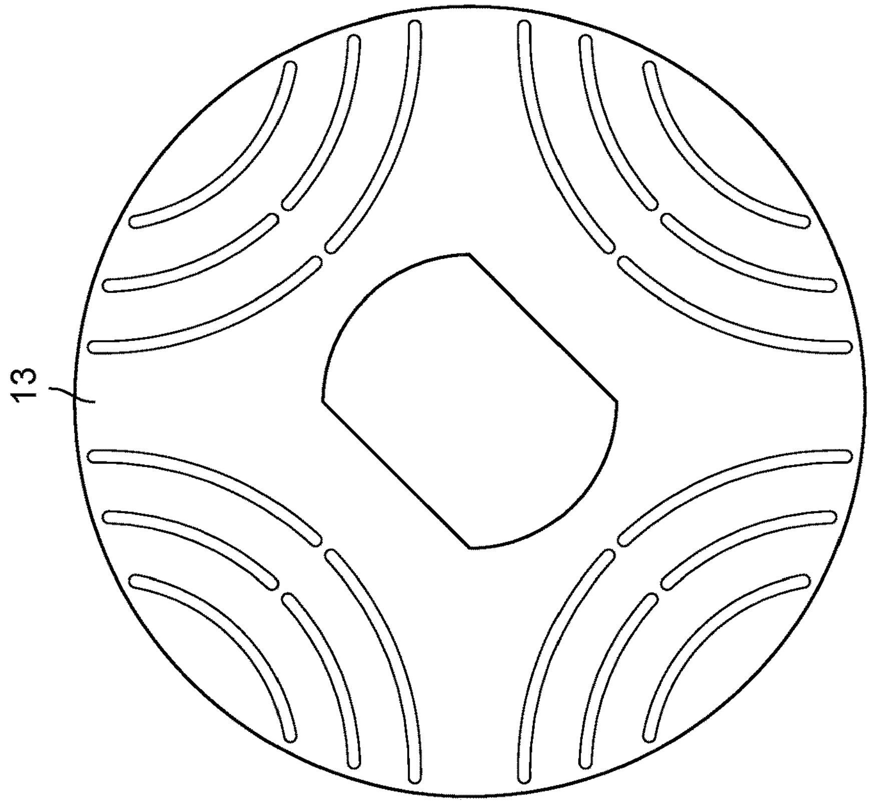
FIG. 11 is a front view of a rotor lamination of a switched reluctance motor having a D-shaped shaft connection that may be used with the impact tool of FIG. 1.
Figure 10:
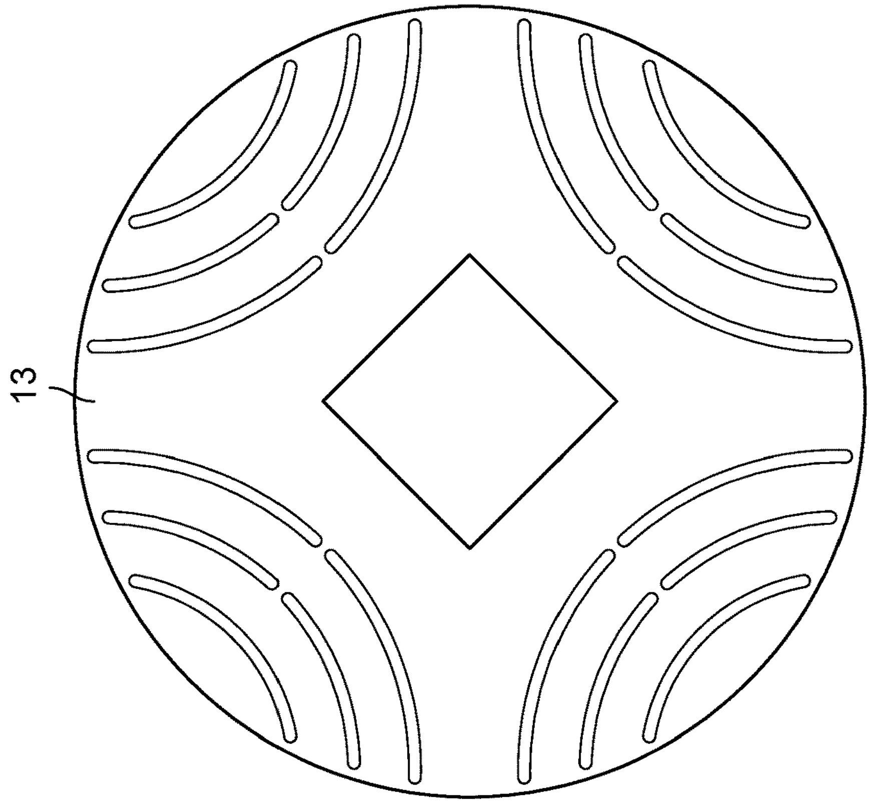
FIG. 10 is a front view of a rotor lamination of a switched reluctance motor having a nontraditional shaft connection geometry that may be used with the impact tool of FIG. 1.
Figure 13:
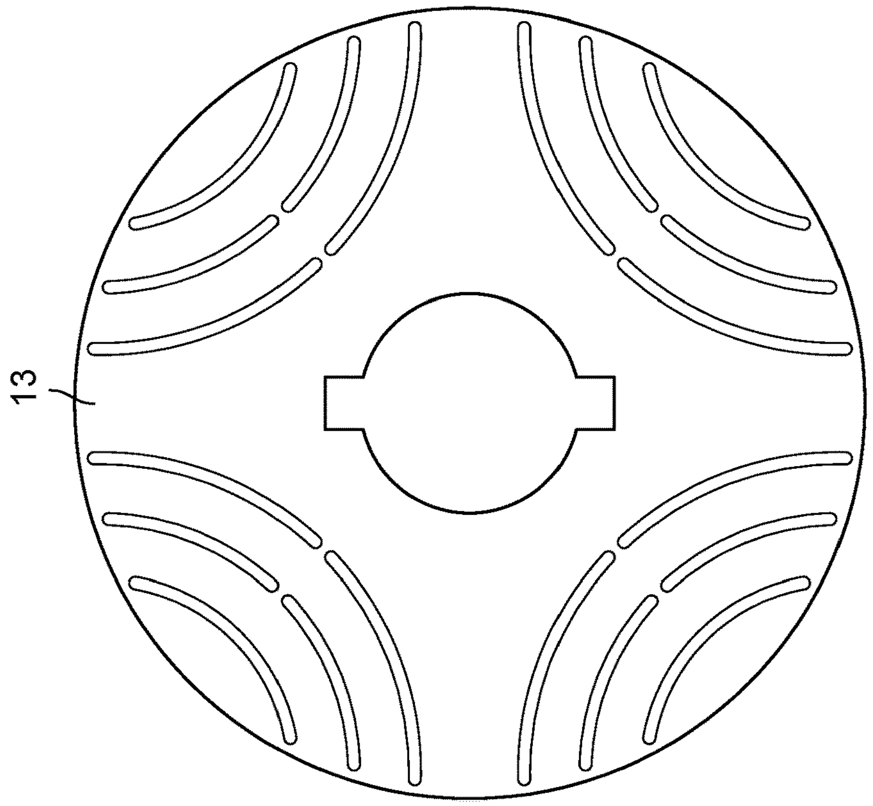
FIGS. 12-13 show a front view of a rotor lamination of a switched reluctance motor having a splined geometry that may be used with the impact tool of FIG. 1.
Figure 12:
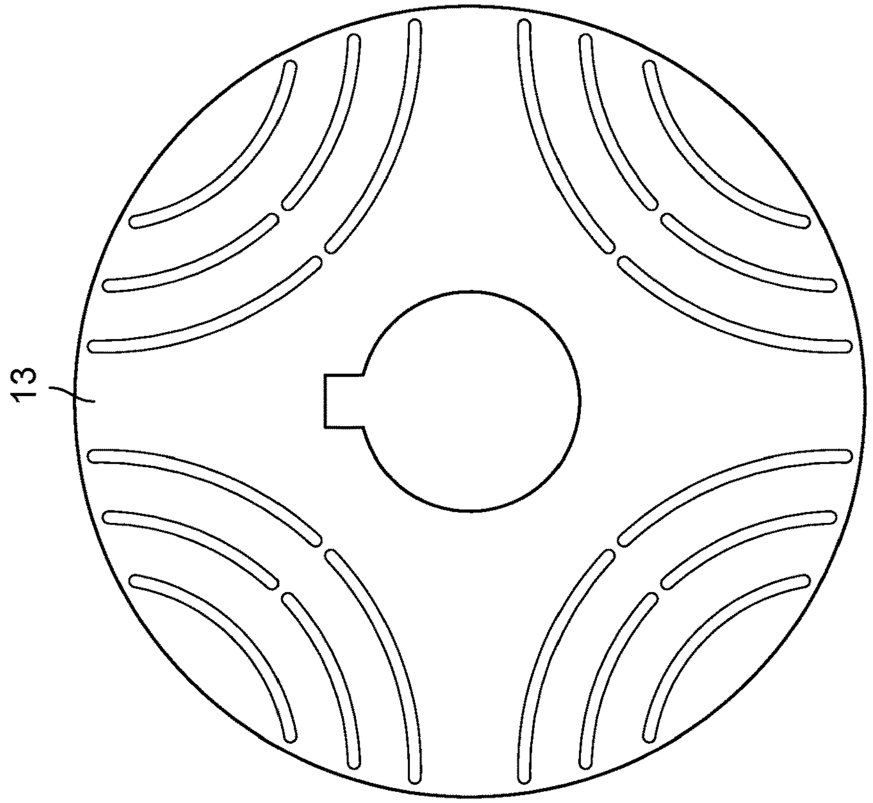
Figure 15:
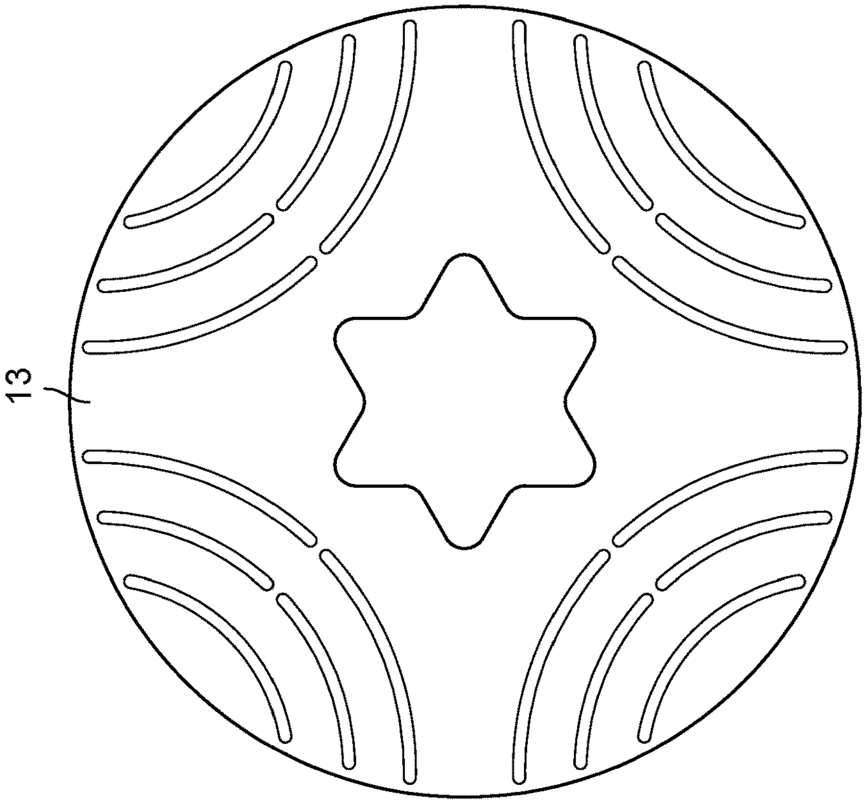
FIG. 15 is a front view of a rotor lamination of a switched reluctance motor having a star geometry that may be used with the impact tool of FIG. 1.
Figure 14:
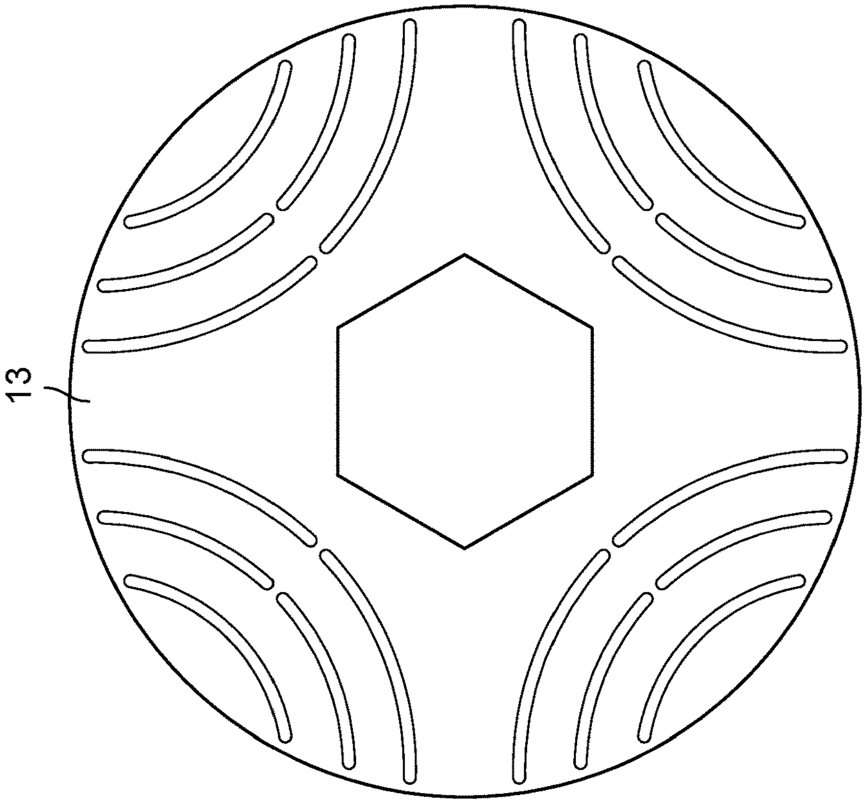
FIG. 14 is a front view of a rotor lamination of a switched reluctance motor having a hex geometry that may be used with the impact tool of FIG. 1.
Figure 16:
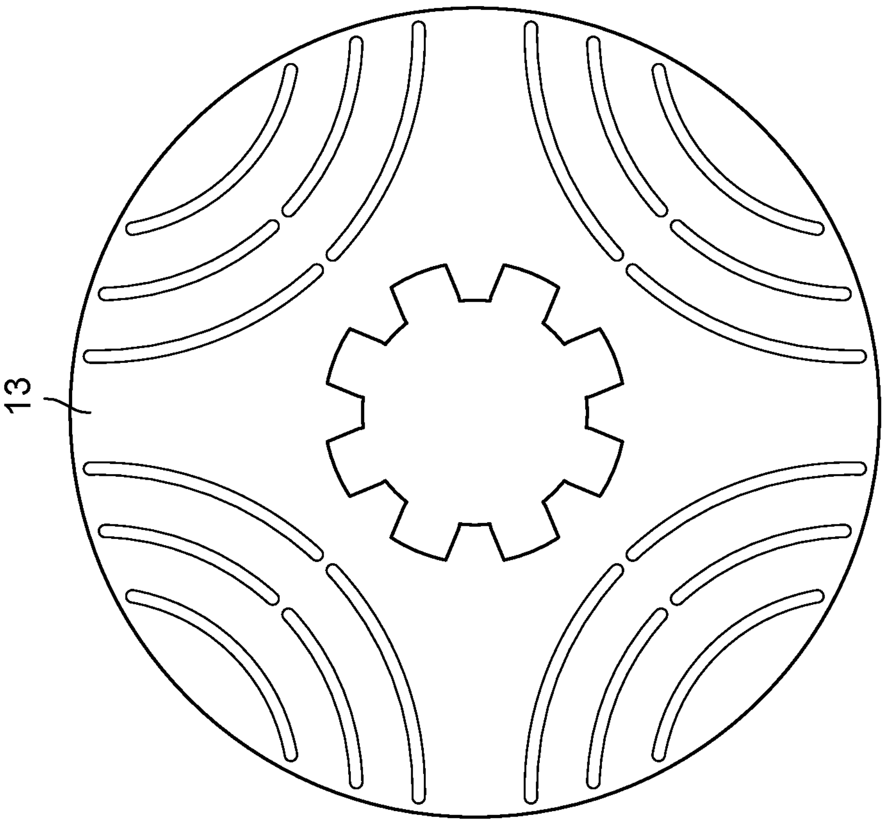
FIG. 16 is a front view of a rotor lamination of a switched reluctance motor having a splined geometry that may be used with the impact tool of FIG. 1.
Figure 17:
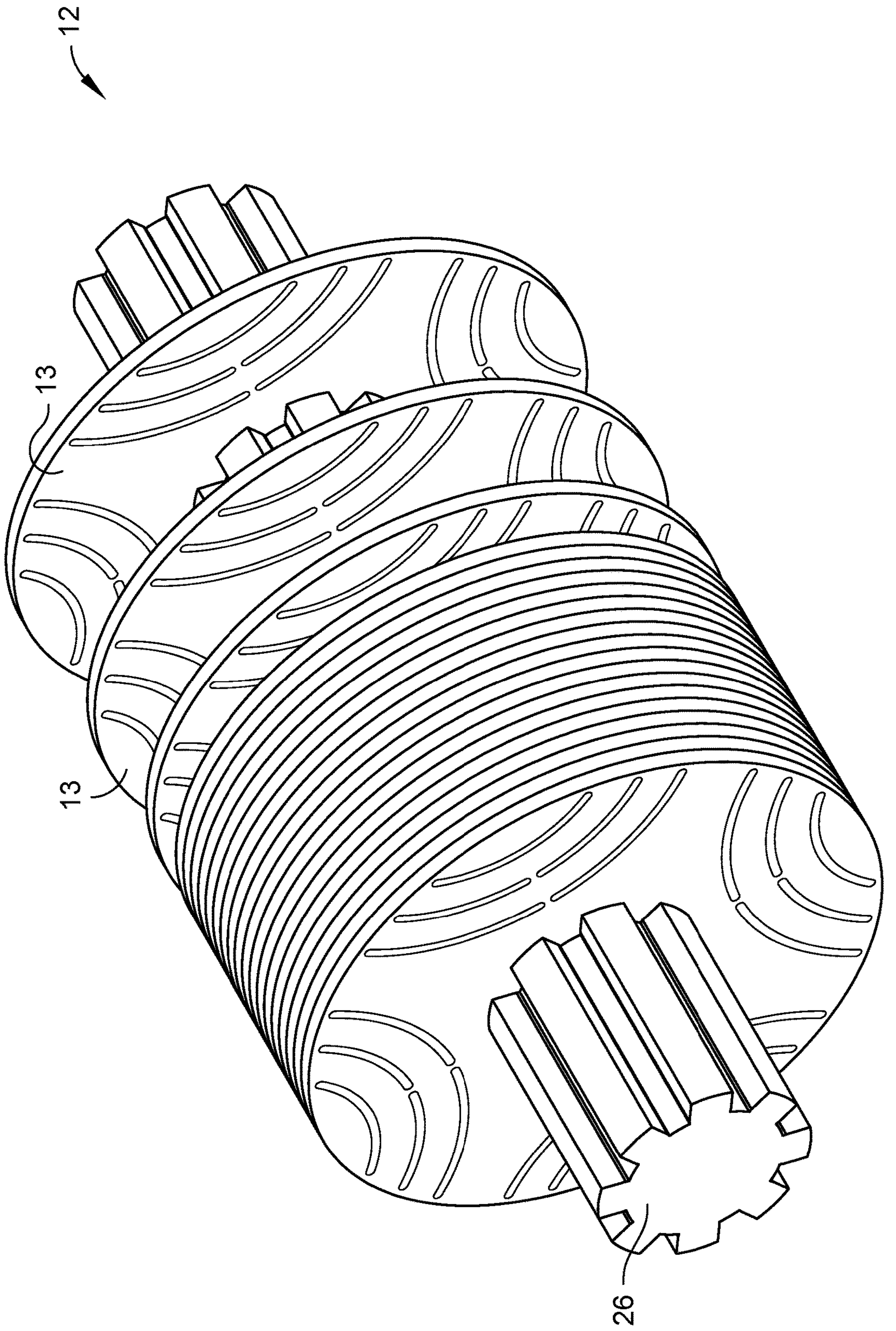
FIG. 17 is an isometric view of a motor having a splined rotor that may be used with the impact tool of FIG. 1.

In some embodiments, electric motor 12 may be further "ruggedized" in order to sustain frequent and sharp changes in velocity and rotational direction of rotor 26 and any associated changes in current and/or voltage. Depending on the particular embodiment, ruggedized electric motor 12 may be embodied as, for example, a "DC brushless permanent magnet" motor (illustrative embodiments of which are disclosed in U.S. Pat. No. 6,196,332, the entirety of which is incorporated by reference herein), a "switched reluctance" motor, a "synchronous reluctance" motor, an "induction" motor, or a "high frequency induction" motor. In some embodiments, a switched reluctance motor may be embodied as a brushless motor without magnets such that there are no magnets to break or demagnetize and may include a rotor 26 having a large spline. Further, in some embodiments, electric motor 12 may include, for example, ring magnets or interior permanent magnets, nontraditional geometry features to provide a non slip joint between rotor 26 and rotor laminations 13 such as D-shaped (FIG. 11), star (FIG. 15), hex (FIG. 14), spline (FIGS. 12-13 and 16-17); features to prevent relative slip between laminations 13 such as dimples, external welds; clamping and/or other features configured to prevent or reduce the occurrence of demagnetization; reduce overheating of electric motor 12; and/or otherwise provide for longevity of electric motor 12.

The simplified block diagram of FIG. 2 further shows control system 30 of impact tool 10 configured to regulate the amount of current supplied to electric motor 12. It will be appreciated by skilled artisans upon reading the present disclosure that, in embodiments in which there is a rigid or direct coupling 42 between electric motor 12 and impact mechanism 14, the current supplied to electric motor 12 spikes in response to the rebound of hammer 102 of impact mechanism caused from hammer 102 impacting anvil 104 (e.g., from a higher current draw when hammer 102 is moving slowly). As previously discussed, only compliant couplings between the motor and impact mechanism are used with electric motors because of the risk of a current surge. Sudden stops in electric motor 12 associated with such impacts, without a current limiting circuit (such as current limiting circuit 40), will create surges in the windings on rotor 26 of electric motor 12 and all electric circuits in series with it, which may lead to failure of various components of electric motor 12 and control circuit 32. Additionally, electric motor 12 current rises as the speed of electric motor 12 (i.e., the rotational speed of rotor 26) falls. Accordingly, the slow speeds encountered by rotor 26 during rebound and when regaining speed in the forward impact direction result in high currents, which, without the current-limiting mechanism may lead to high temperatures in the windings of electric motor 12 that oftentimes damage the insulation and other components of electric motor 12 or high temperatures in the power switches in series with the windings which may lead to immediate or eventual fatigue failure.

Accordingly, in the illustrative embodiment, control system 30 regulates the supply of current to electric motor 12 via current-limiting circuit 40 to, for example, prevent such spikes to electric motor 12 and/or achieve a desired parameter of impact mechanism 14. Control system 30 generally includes a control circuit 32, electric motor 12, impact mechanism 14, and energy source 34. Additionally, as shown in FIG. 2, control system 30 may include a user interface 36 and/or one or more sensors 38 in some embodiments. It will be appreciated by the skilled artisans that certain mechanical and electromechanical components of impact tool 10 are not shown in FIG. 2 for clarity.

In the illustrative embodiment, control circuit 32 constitutes a part of impact tool 10 and is communicatively coupled to energy source 34, electric motor 12, user interface 36, and sensors 38 of impact tool 10 via one or more wired connections. In other embodiments, control circuit 32 may be electrically and/or communicatively coupled to energy source 34, electric motor 12, user interface 36, and/or sensors 38 via other types of connections (e.g., wireless or radio links). In the illustrative embodiment, control circuit 32 includes current-limiting circuit 40 configured to limit the current supplied to electric motor 12 (e.g., by the energy source 34) at various points in time. For example, in some embodiments, the current-limiting circuit 40 may prevent the current supplied to electric motor 12 from exceeding a threshold in response to hammer 102 impacting anvil 104 (e.g., during rebound of hammer 102). Current-limiting circuit 40 may be embodied as, for example, a comparator with disable output to inhibit the gate driver or power switch or, another type of semiconductor, or solid state device or circuit. In other embodiments, control circuit 32 and/or current-limiting circuit 40 may be embodied as an electronic controller with or without accompanying firmware, or implemented in an application specific integrated circuit (ASIC).

One or more sensors 38 of impact tool 10 are configured to sense, directly or indirectly, characteristics of electric motor 12 and/or impact mechanism 14. It will be appreciated that sensors 38 may be mounted at any suitable position on or within impact tool 10. In the illustrative embodiment, sensors 38 are configured to sense data that may be used by control circuit 32 to determine (e.g., actively or passively) whether to limit the current supplied to electric motor 12. Accordingly, sensors 38 may be configured to sense, for example, the current or voltage of electric motor 12 or other components of impact tool 10, a rotational speed that various components of impact tool 10 are traveling (e.g., impact mechanism 14, hammer 102, or rotor 26), a rebound angle of hammer 102 after impacting anvil 104, a torque delivered by hammer 102 to anvil 104 upon impact, a frequency at which hammer 102 impacts anvil 106, or another parameter of impact tool 10. As described below, in some embodiments, control circuit 32 may be embodied as an electronic controller configured to determine a desired parameter of impact mechanism 14 such as those described above and to adjust a current threshold to a level associated with achieving the desired parameter. It should be appreciated that, in some embodiments, one or more of sensors 38 may form a portion of control circuit 32. For example, in some embodiments, control circuit 32 may directly sense the current supplied to electric motor 12 and prevent the current supplied to electric motor 12 from exceeding a predetermined threshold current. Depending on the particular embodiment, the threshold determined by control circuit 32, may be based on data from user interface 36, and/or may be based on the particular components of control circuit 32. Depending on the particular embodiment, sensors 38 may include, for example, proximity sensors, optical sensors, light sensors, motion sensors, and/or other types of sensors. It should be further appreciated, however, that the foregoing examples are illustrative and should not be seen as limiting sensors 38 to any particular type of sensor.

In another embodiment, current-limiting circuit 40 may include cycle-by-cycle current-limiting protection. For example, current-limiting circuit 40 may include a pulse width modulation (PWM) circuit that controls an average amount of current supplied to the motor. During each pulse, the current supplied to the motor through the phase wires is measured. If that current does not exceed a specified threshold, then voltage continues to be applied to the motor. If the current exceeds the threshold, then the drive transistors cutoff the voltage for the remainder of that PWM cycle. The duration of the cutoff is only the remainder of the PWM cycle (may be just a few μs). The process immediately starts again on the next PWM cycle. This process of measuring and assessing current is repeated over and over. Accordingly, for each PWM cycle, current-limiting circuit 40 measures the current shutting down same for each successive cycle the current exceeds the specified threshold for the motor. The cycle by cycle approach has the benefit, once configured in software, to execute without software intervention and provide immediate response to current crossing the threshold.

In another illustrative environment, current-limiting circuit 40 may include a control circuit that dictates the current limits for a particular BLDC motor. The circuit will command what amount of current the motor will operate at and will not deviate from that.

As further shown in FIG. 2, in some embodiments, control system 30 also includes a user interface 36. In such embodiments, user interface 36 permits a user to interact with control circuit 32 to, for example, modify a threshold current value of electric motor 12 or other desired parameter of impact tool 10 (e.g., a rebound angle of hammer 102 after impacting anvil 104, a torque delivered by hammer 102 to anvil 104 upon impact, or a frequency at which hammer 102 impacts anvil 104). As such, in some embodiments, user interface 36 includes a keypad, a touch screen, a display, switches, knobs, and/or other mechanisms to permit I/O functionality.

Figure 3:
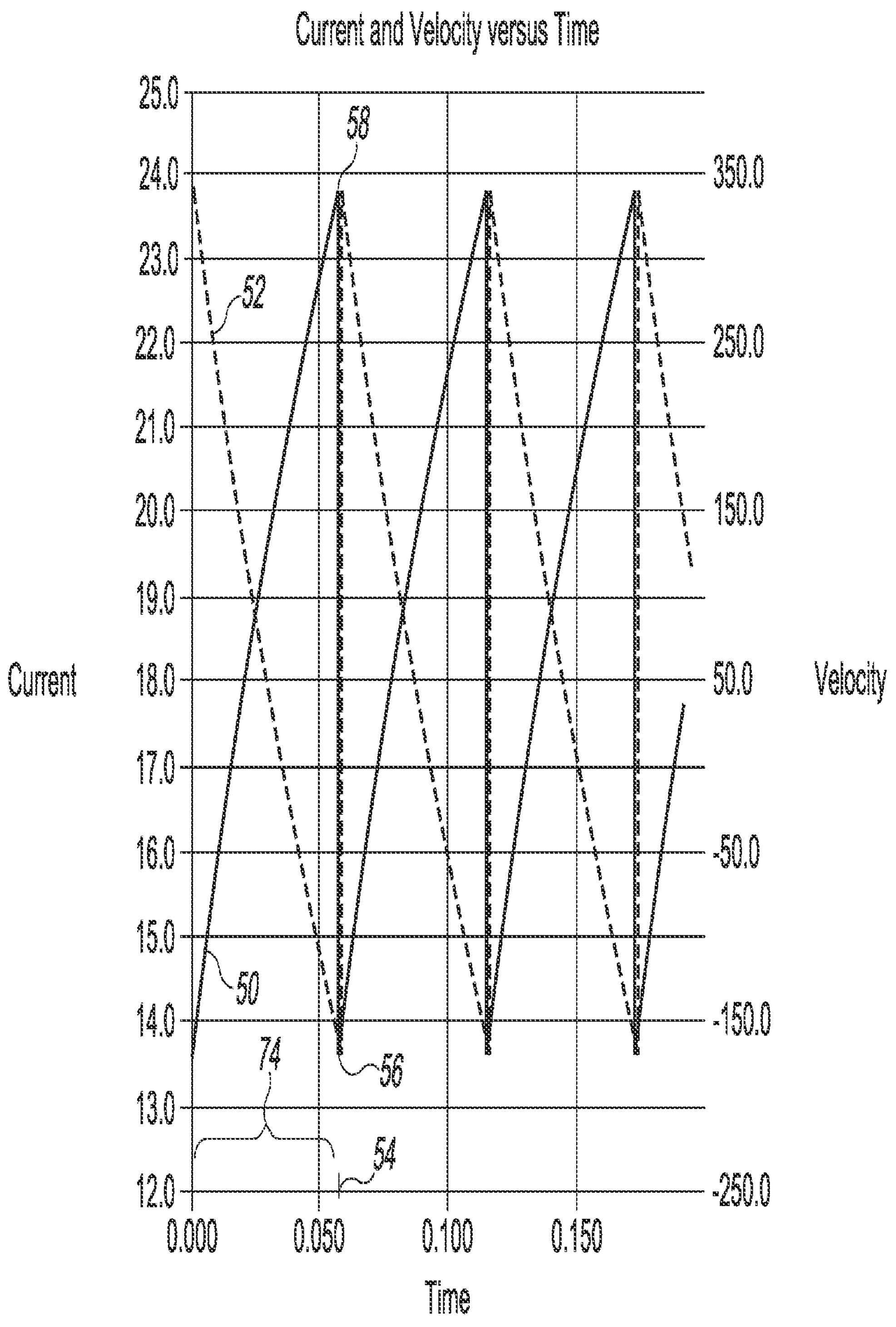
FIG. 3 is a current and velocity waveform of an impact tool without any current threshold limitation.
Figure 4:
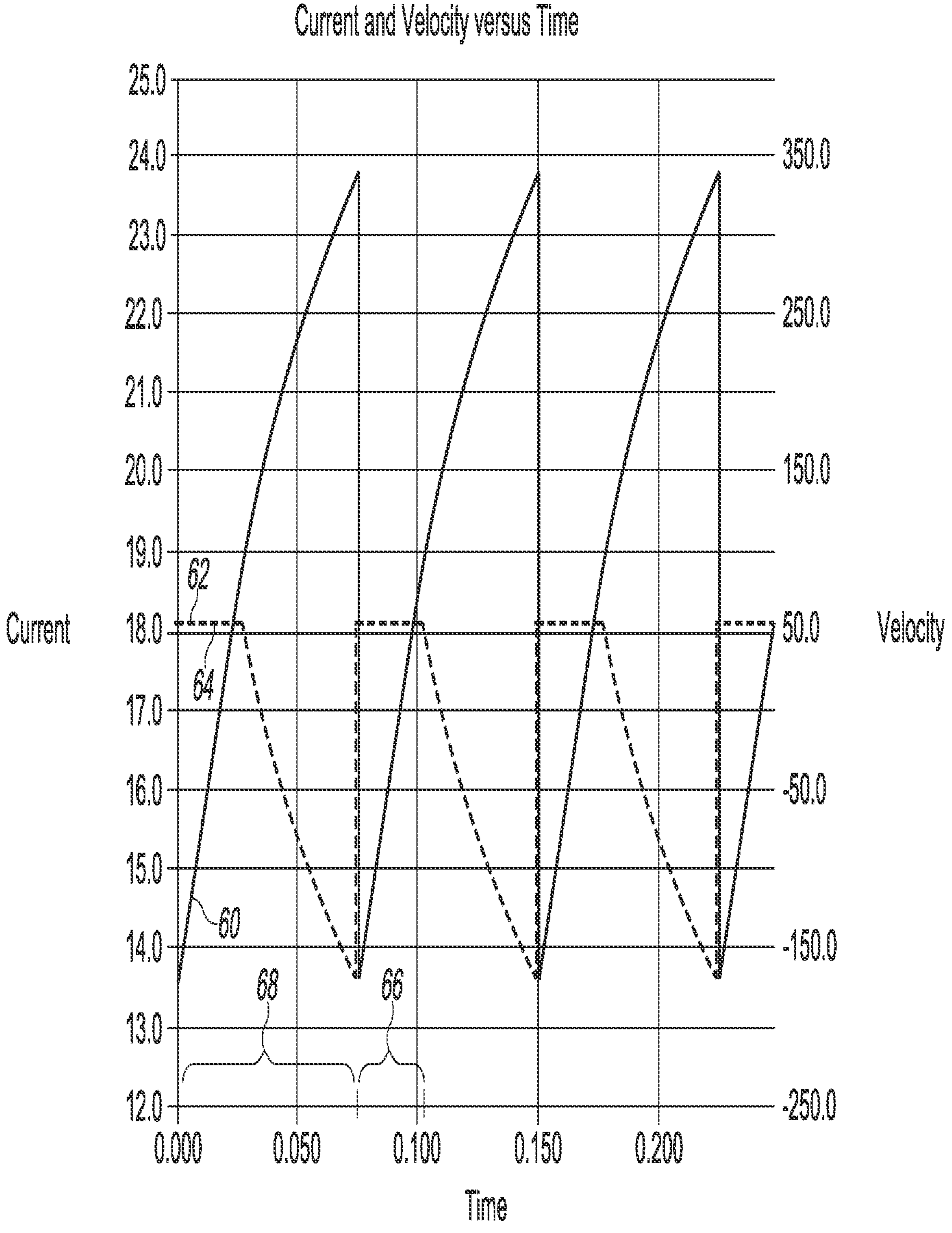
FIG. 4 is an illustrative embodiment of a current and velocity waveform of the impact tool of FIG. 1 with a first current threshold limitation.
Figure 5:
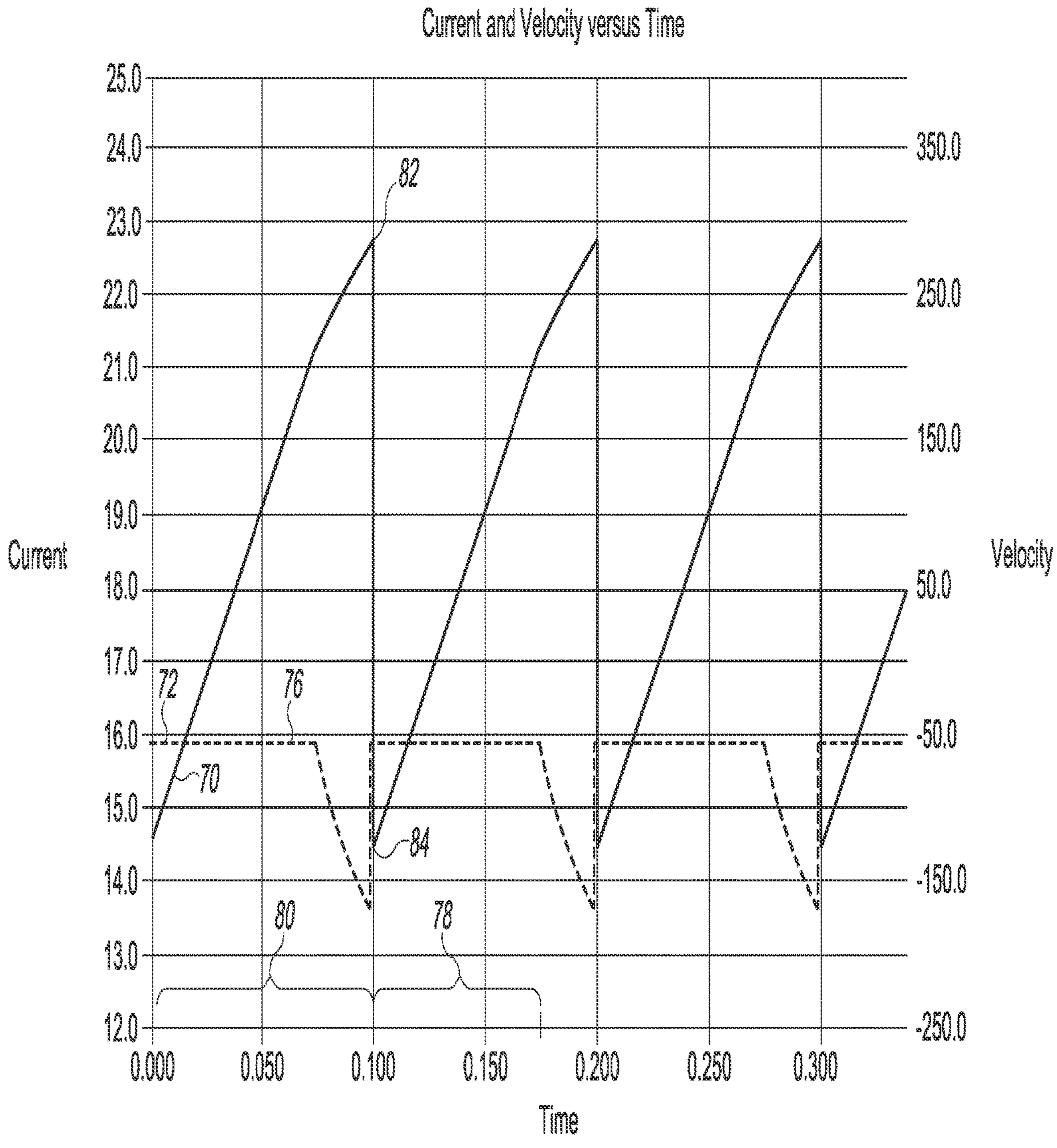
FIG. 5 is an illustrative embodiment of a current and velocity waveform of the impact tool of FIG. 1 with a second current threshold limitation.

Referring now to FIGS. 3-5, illustrative embodiments of current and velocity waveforms of impact tool 10 are shown. In particular, velocity waveforms 50, 60, 70 illustrating a rotational velocity of hammer 102 of impact mechanism 14 and current waveforms 52, 62, 72 illustrating a current supplied to electric motor 12 at corresponding times are shown. It will be appreciated that the particular values of time, current, and velocity are provided in FIGS. 3-5 for ease of description and in no way limit the present disclosure.

Referring now to FIG. 3, velocity waveform 50 and current waveform 52 illustrate the characteristics of impact tool 10 without any current limits applied to electric motor 12. As shown, hammer 102 of impact mechanism 14 continues to increase its rotational velocity 50 until a point 54 in time at which hammer 102 impacts anvil 104. Upon impact, hammer 102 transfers torque to anvil 104 and rebounds in a direction opposite the direction of rotation prior to impact. It will be appreciated that, due to the transfer of energy, hammer 102 rebounds with a rotational velocity 50 having a magnitude 56 less than magnitude 58 of the forward impact velocity. During rebound, hammer 102's rotational speed slows until hammer 102 momentarily stops and again begins moving in the forward impact direction. Hammer 102 continues to increase its rotational velocity 50 until it again impacts anvil 104, and so on.

As shown in FIG. 3, assuming constant applied voltage, as velocity 50 of hammer 102 increases, current 52 of electric motor 12 decreases. As the rotational velocity increases, the motor's back EMF rises, so for a given supply voltage, there is less voltage drop across the motor (supply voltage minus back EMF) and so less current flows—the current is equal to the voltage drop divided by the effective resistance. It is conceivable that the effective supply voltage could be increased to maintain the current, but if it is not, as the motor speed increases, the current falls due to the increasing back EMF voltage. That said, and as described above, current 52 being supplied to the motor spikes to its maximum value in response to the hammer impacting the anvil. This demonstrates the danger of having an impact mechanism directly coupled to the motor. When the rotor is forced to immediately stop at 56, the current supplied to the motor spikes. This occurs time and time again as FIG. 3 demonstrates. It is current spikes 58 and/or periods of high current that will cause overheating and damage to the motor as well associated electronic components feeding power to the motor.

Referring now to FIG. 4, velocity waveform 60 and current waveform 62 illustrate the operational characteristics of impact tool 10 during rebound in response to hammer 102 impacting anvil 104. In contrast to FIG. 3, here impact tool 10 has limited current 62 supplied to electric motor 12 or otherwise prevented current 62 from exceeding a threshold 64. It will be appreciated that waveforms 60, 62 are similar to waveforms 50, 52, but with some significant differences. In particular, in the illustrative embodiment, current 62 supplied to electric motor 12 has been limited to threshold 64 and therefore current waveform 62 does not exceed that threshold at any point in time. In such a way, impact tool 10 is able to prevent or reduce a spike in current 62 (such as spike 58 of FIG. 3) typically associated with the rebound of hammer 102 upon impact with anvil 104 (i.e., limit to threshold 64). Further, in the illustrative embodiment, velocity 60 of hammer 102 is linear (i.e., having constant acceleration) during a period 66 in which current 62 is limited and nonlinear elsewhere as shown in FIG. 4. It should be further appreciated that, due to current 62 being limited, the frequency at which hammer 102 impacts anvil 104 is decreased. In other words, period 68 of time between impacts in current-limited embodiment of FIG. 4 is increased compared to period 74 between impacts in the embodiment of FIG. 3. But even with time period 74, the motor will create sufficient velocity to create the necessary impact. Further, in some embodiments, peak velocity 60 of hammer 102 may be reduced due to the limit on current 62 supplied to electric motor 12.

Referring now to FIG. 5, velocity waveform 70 and current waveform 72 illustrate the operational characteristics of impact tool 10 during rebound in response to hammer 102 impacting anvil 104. In contrast to FIGS. 3 and 4, here impact tool 10 has further adjusted a threshold 76 of current 72 supplied to electric motor 12 to a level associated with achieving a desired parameter of impact mechanism 14. In particular, in the illustrative embodiment, impact tool 10 has limited current 72 to threshold 76 to achieve a desired rebound angle of hammer 102. As shown in FIG. 5, velocity 70 is linear during a period 78 in which current 72 is limited and nonlinear elsewhere similar to that described above with respect to FIG. 4. Additionally, because current 72 is further limited than current 62 of FIG. 4, period 80 of time between impacts is greater than in the embodiment of FIG. 4 as well as that of FIG. 3. Further, maximum velocity 82 and minimum velocity 84 of hammer 102 are smaller in magnitude compared to the embodiment of FIG. 3 due to the current limiting. Again, however, the velocity is still sufficiently increased to create the necessary impact. It will also be appreciated that adjustments to current threshold 76 result in a velocity waveform 70 can be made to correlate with the desired rebound angle of hammer 102.

Because of the various current limiting schemes, it is safe for rotor 26 to be directly coupled to impact mechanism 14 as indicated at 42 of FIG. 2. As a consequence, impact tool 10 may employ different impact mechanisms that are otherwise only reserved for air motor impact tools. For example, and as indicated above, impact mechanism 14 of impact tool 10 may, in some embodiments, be embodied as a swinging weight type impact mechanism or a ski jump type impact mechanism. Illustrative embodiments of those types of impact mechanisms are shown and described in reference to FIGS. 6A-9.

Figure 6A:
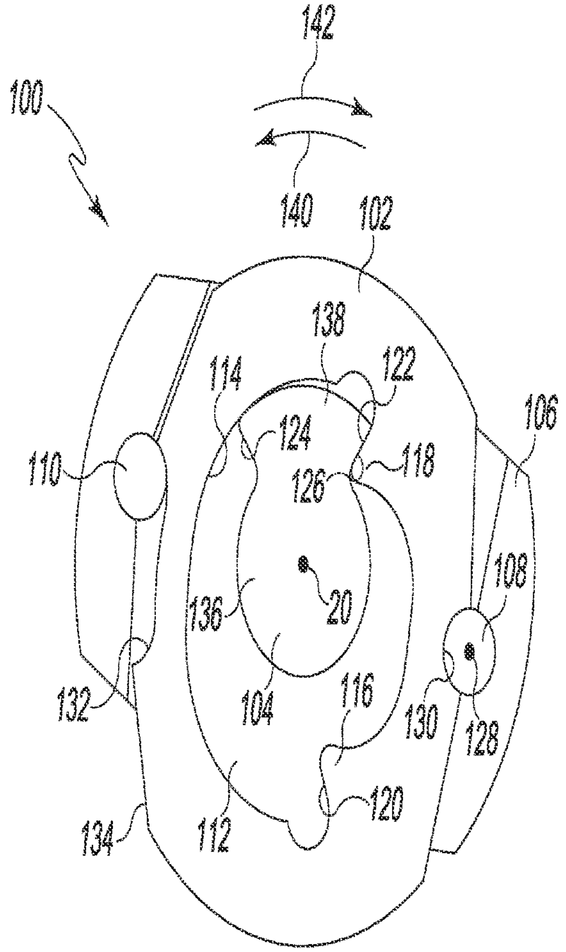
FIG. 6A is a front-end cross-sectional view of an illustrative embodiment of a swinging weight impact mechanism that may be used with the impact tool of FIG. 1.
Figure 6B:
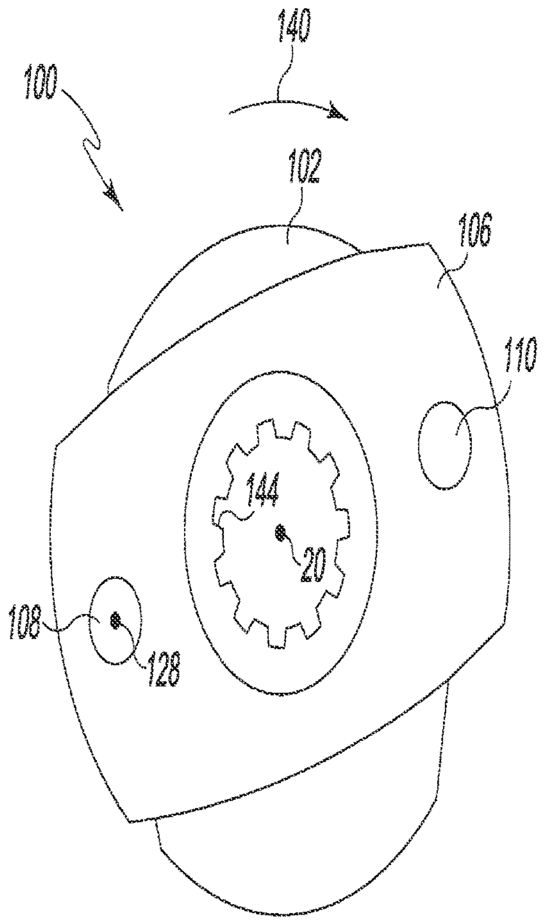
FIG. 6B is a rear-end cross-sectional view of the swinging weight impact mechanism of FIG. 6A.

Referring now to FIGS. 6A and 6B, one illustrative embodiment of a swinging weight impact mechanism 100 that may be used with impact tool 10 is shown. In particular, FIG. 6A illustrates a cross-section of impact mechanism 14 from the perspective of front end 22 of impact tool 10, while FIG. 6B illustrates a cross-section of impact mechanism 100 from the perspective of rear end 24 of impact tool 10. It will be appreciated that impact mechanism 100 is similar to a Maurer-type impact mechanism.

Impact mechanism 100 illustratively includes a hammer 102, and anvil 104, a hammer frame 106, a pivot pin 108, and a retaining pin 110. As can be seen in FIG. 6A, anvil 104 extends along axis 20 through a void 112 formed in hammer 102 (such that anvil 104 is disposed partially in void 112). Void 112 is defined by an interior surface 114 of hammer 102 and a pair of impact jaws 116, 118 that extend inward from interior surface 114 (toward axis 20), as shown in FIG. 6A. The impact jaw 116 includes an impact face 120, and impact jaw 118 includes an impact face 122. Each of the impact faces 120, 122 is configured to impact a corresponding impact face 124, 126 of anvil 104 (depending on the direction of rotation of hammer 102), as described further below.

Hammer 102 is supported by hammer frame 106 for rotation therewith about axis 20. In particular, hammer 102 is pivotally coupled to hammer frame 106 via pivot pin 108, which is disposed along an axis 128 that is generally parallel to and spaced apart from axis 20. As shown in FIG. 6A, a pivot groove 130 and a retaining groove 132 are each formed in an outer surface 134 of hammer 102 on opposite sides of hammer 102. In the illustrative embodiment, each of the pivot groove 130 and the retaining groove 132 extends substantially parallel to axis 20. Pivot pin 108 is coupled to one side of hammer frame 106 and is received in the pivot groove 130 of hammer 102, while a retaining pin 110 is coupled to an opposite side of hammer frame 106 and is received in the retaining groove 132. The retaining groove 132 and retaining pin 110 are configured to limit a distance that hammer 102 can pivot about pivot pin 108.

As will be appreciated from FIGS. 6A and 6B, pivot pin 108 (and, hence, the axis 128) will rotate about axis 20 when hammer frame 106 rotates about axis 20. Accordingly hammer 102 is configured to both pivot about pivot pin 108 (i.e., about the axis 128) and to rotate about axis 20. Of course, due to pivoting of hammer 102 about pivot pin 108, the center of hammer 102 may follow a complex, non-circular path as hammer 102 rotates about axis 20.

Anvil 104 includes a cylindrical body 136 and a lug 138 that extends outward from cylindrical body 136 (i.e., in a radial direction relative to axis 20). Cylindrical body 136 of anvil 104 is generally cylindrical in shape but may include sections of varying cross-section. As indicated above, anvil 104 may be integrally formed with or coupled to the output drive 16 such that rotation of anvil 104 drives rotation of the output drive 16. Lug 138 of anvil 104 includes impact face 126 that is impacted by impact face 122 of hammer 102 when hammer 102 is rotated in a tightening direction 140 (e.g., clockwise from the perspective of rear end 24 of impact tool 10). Lug 138 of anvil 104 also includes impact face 124 that is impacted by impact face 120 of hammer 102 when hammer 102 is rotated in a loosening direction 142 (e.g., counter-clockwise from the perspective of rear end 24 of impact tool 10).

In the illustrative embodiment, hammer frame 106 is rigidly coupled to rotor 26 of electric motor 12 via a splined interface 144 between those components. That is, in the illustrative embodiment, rotor 26 includes splines that tightly couple to the splined interface 144 of hammer frame 106 to create a rigid coupling 42 between electric motor 12 and impact mechanism 14. Of course, in other embodiments, rigid coupling 42 may be otherwise created. As such, rotation of rotor 26 drives rotation of hammer frame 106 about axis 20, which in turn drives rotation of hammer 102 about axis 20.

During operation of impact mechanism 100, electric motor 12 drives rotation of hammer frame 106, which is pivotally coupled to hammer 102 by pivot pin 108. Accordingly, hammer frame 106 drives rotation of hammer 102 in the same direction as the direction of rotation of hammer frame 106. As hammer 102 rotates about anvil 104, leading impact face 120, 122 (depending on the direction of rotation) of hammer 102 will impact corresponding impact face 124, 126 of anvil 104, imparting a torque on anvil 104 and causing hammer 102 to rebound. By way of example, where hammer 102 is traveling in direction 140 prior to impact with anvil 104, hammer 102 will rebound in direction 142 after impact (e.g., during the tightening of a fastener with impact tool 10).

Figure 7A:
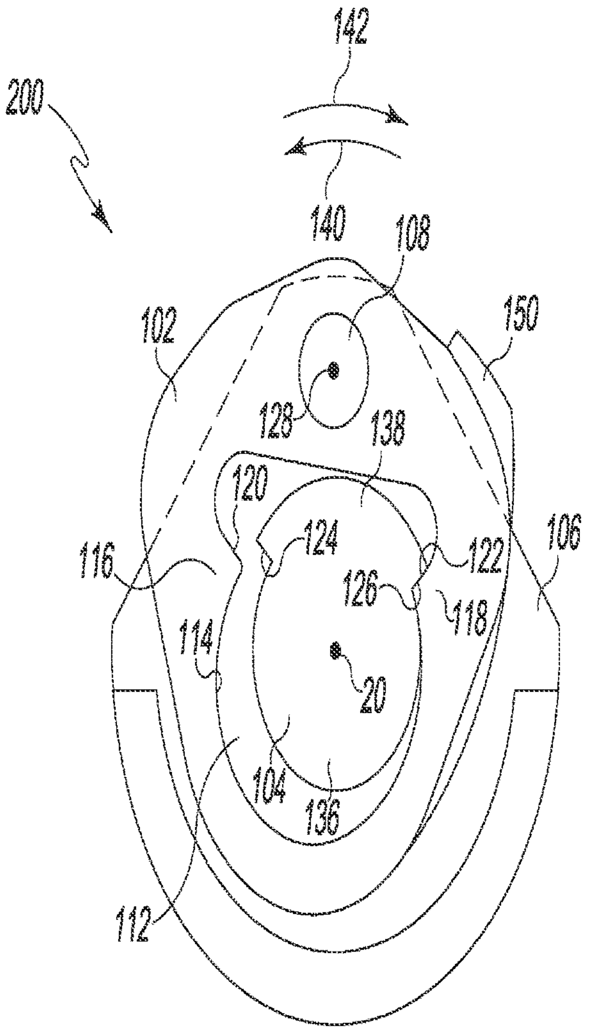
FIG. 7A is a front-end cross-sectional view of another illustrative embodiment of a swinging weight impact mechanism that may be used with the impact tool of FIG. 1.
Figure 7B:
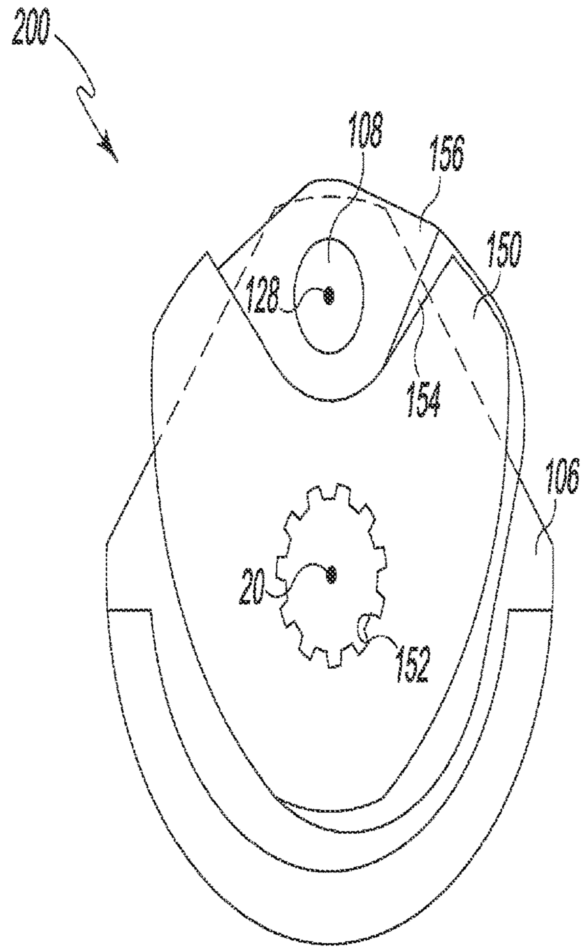
FIG. 7B is a rear-end cross-sectional view of the swinging weight impact mechanism of FIG. 7A.

Referring now to FIGS. 7A and 7B, yet another illustrative embodiment of a swinging weight impact mechanism 200 that may be used with impact tool 10 is shown. In particular, FIG. 7A illustrates a cross-section of impact mechanism 200 from the perspective of front end 22 of impact tool 10, while FIG. 7B illustrates a cross-section of impact mechanism 200 from the perspective of rear end 24 of impact tool 10. Impact mechanism 200 is similar to impact mechanism 100; however, unlike impact mechanism 100, the illustrative impact mechanism 200 includes a camming plate 150 that drives rotation of hammer 102.

In the illustrative embodiment, camming plate 150 is rigidly coupled to rotor 26 of electric motor 12 via an illustrative splined interface 152 between those components. Of course, in other embodiments, rigid coupling 42 between electric motor 12 and impact mechanism 14 may be otherwise created. As best seen in FIG. 7B, camming plate 150 includes an aperture 154 defined therein within which a linkage 156 of hammer 102 is disposed when impact mechanism 200 is assembled. Camming plate 150 is configured to drive rotation of hammer 102 (via linkage 156) about axis 20, when rotation of camming plate 150 about axis 20 is driven by electric motor 12. Camming plate 150 also serves to bias hammer 102 toward a disengaged position, in which leading impact face 120, 122 (depending on the direction of rotation) of hammer 102 does not impact corresponding impact face 124, 126 of lug 138 of anvil 104. In other words, camming plate 150 applies a force to hammer 102 that includes a force component in a radially outward direction (e.g., away from axis 20).

During operation of impact tool 10, electric motor 12 drives rotation of camming plate 150 about axis 20 such that camming plate 150 drives rotation of hammer 102 about axis 20. That is, camming plate 150 forces linkage 156 of hammer 102 in the same direction of rotation, thereby driving rotation of hammer 102 itself and pivotally coupled hammer frame 106 about axis 20. As hammer 102 rotates about anvil 104, lug 138 of anvil 104 interacts with interior surface 114 of hammer 102 to move hammer 102 into an engaged position (overcoming the radially outward biasing force applied by camming plate 150). While in the engaged position, hammer 102 continues to rotate about anvil 104 until leading impact face 120, 122 (depending on the direction of rotation) of hammer 102 impacts corresponding impact face 124, 126 of lug 138 of anvil 104 (as shown, for rotational direction 140, in FIG. 7A). Upon impact, hammer 102 delivers a torque to anvil 104 and rebounds from anvil 104 in a direction opposite the direction of rotation of hammer 102 prior to impact. That is, a reactionary force is applied by anvil 104 to hammer 102 that causes the rebound of hammer 102 described above (i.e., this reactionary force tends to separate leading impact face 120, 122 of hammer 102 from corresponding impact face 124, 126 of anvil 104).

Figure 8A:
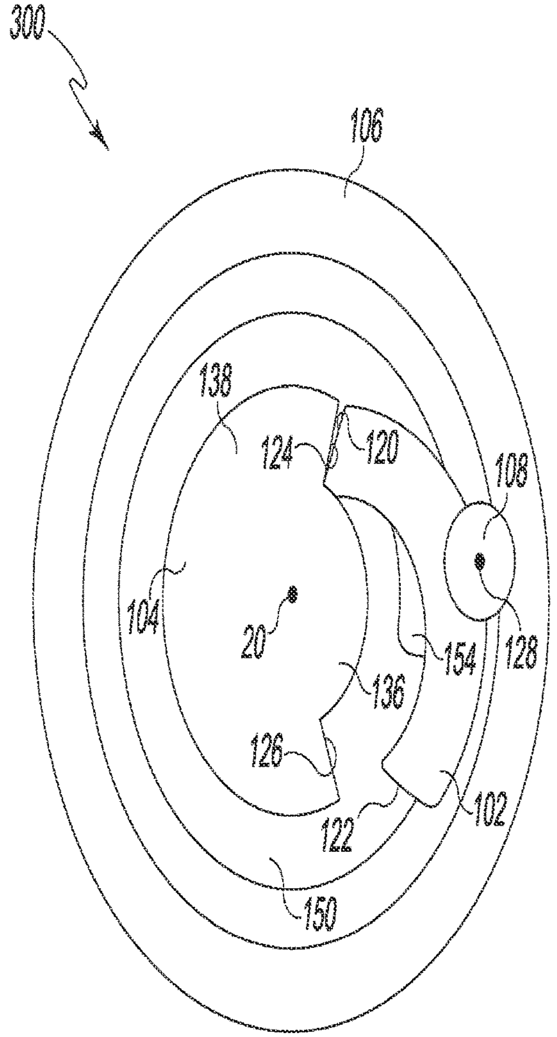
FIG. 8A is a front-end cross-sectional view of still another illustrative embodiment of a swinging weight impact mechanism that may be used with the impact tool of FIG. 1.
Figure 8B:
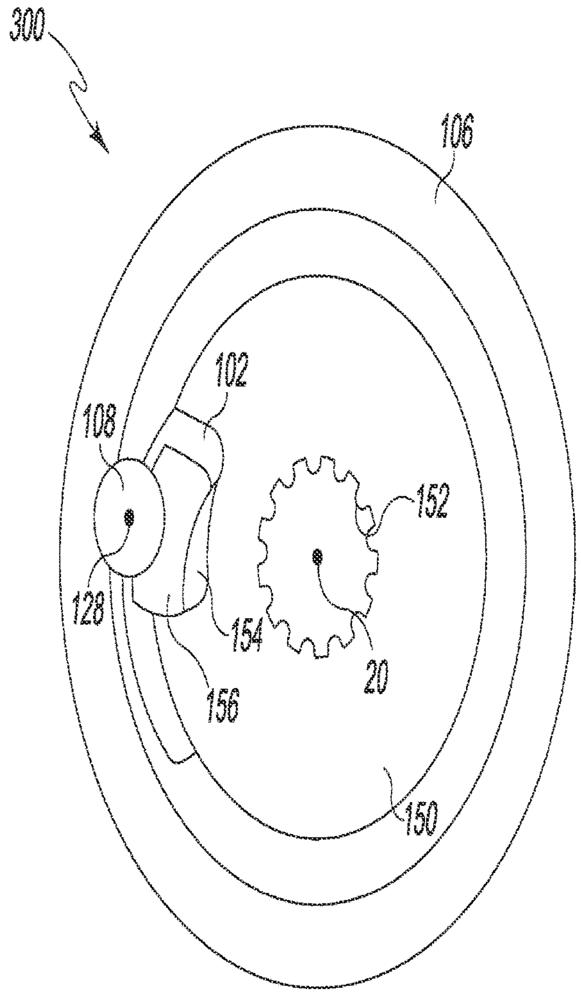
FIG. 8B is a rear-end cross-sectional view of the swinging weight impact mechanism of FIG. 8A.

Referring now to FIGS. 8A and 8B, still another embodiment of a swinging weight impact mechanism 300 that may be used with impact tool 10 is shown. In particular, FIG. 8A illustrates a cross-section of impact mechanism 300 from the perspective of front end 22 of impact tool 10, while FIG. 8B illustrates a cross-section of impact mechanism 300 from the perspective of rear end 24 of impact tool 10. It will be appreciated that impact mechanism 300 is similar to a "rocking dog" type impact mechanism. Although the components are sized and oriented differently, impact mechanism 300 includes similar features to impact mechanism 200 described above. For example, impact mechanism 300 includes a hammer 102, an anvil 104, a hammer frame 106, a camming plate 150, and a pivot pin 108. Unlike impact mechanism 200, however, hammer 102 of impact mechanism 300 is not formed with a void. Rather, as shown in FIG. 8A, hammer 102 has a boomerang-shape that is pivotally coupled to hammer frame 106 by pivot pin 108. This differing configuration results in hammer 102 of impact mechanism 300 being in compression during an impact with anvil 104 (which may be contrasted with hammer 102 of impact mechanism 200, which is in tension during an impact with anvil 104). Similar to impact mechanism 200, hammer 102 includes an impact face 120 and an impact face 122.

Furthermore, the operation of impact mechanism 300 is generally similar to that of impact mechanism 200. For instance, during operation of an impact tool 10 incorporating impact mechanism 300, electric motor 12 drives rotation of camming plate 150 via the splined interface 152. Camming plate 150, in turn, drives rotation of hammer 102 via linkage 156. Upon impact with anvil 104, hammer 102 applies a torque to anvil 104 and rebounds from anvil 104 in the opposite direction. Additionally, as with camming plate 150 of impact mechanism 200, camming plate 150 of impact mechanism 300 biases hammer 102 toward a disengaged position relative to anvil 104 (e.g., radially outward relative to axis 20). Although impact mechanism 300 shows camming plate 150 as being rigidly coupled to rotor 26 via the splined interface 152, in other embodiments, rigid coupling 42 between rotor 26 and camming plate 150 may be otherwise created (e.g., by integral formation of rotor 26 and camming plate 150).

Figure 9:
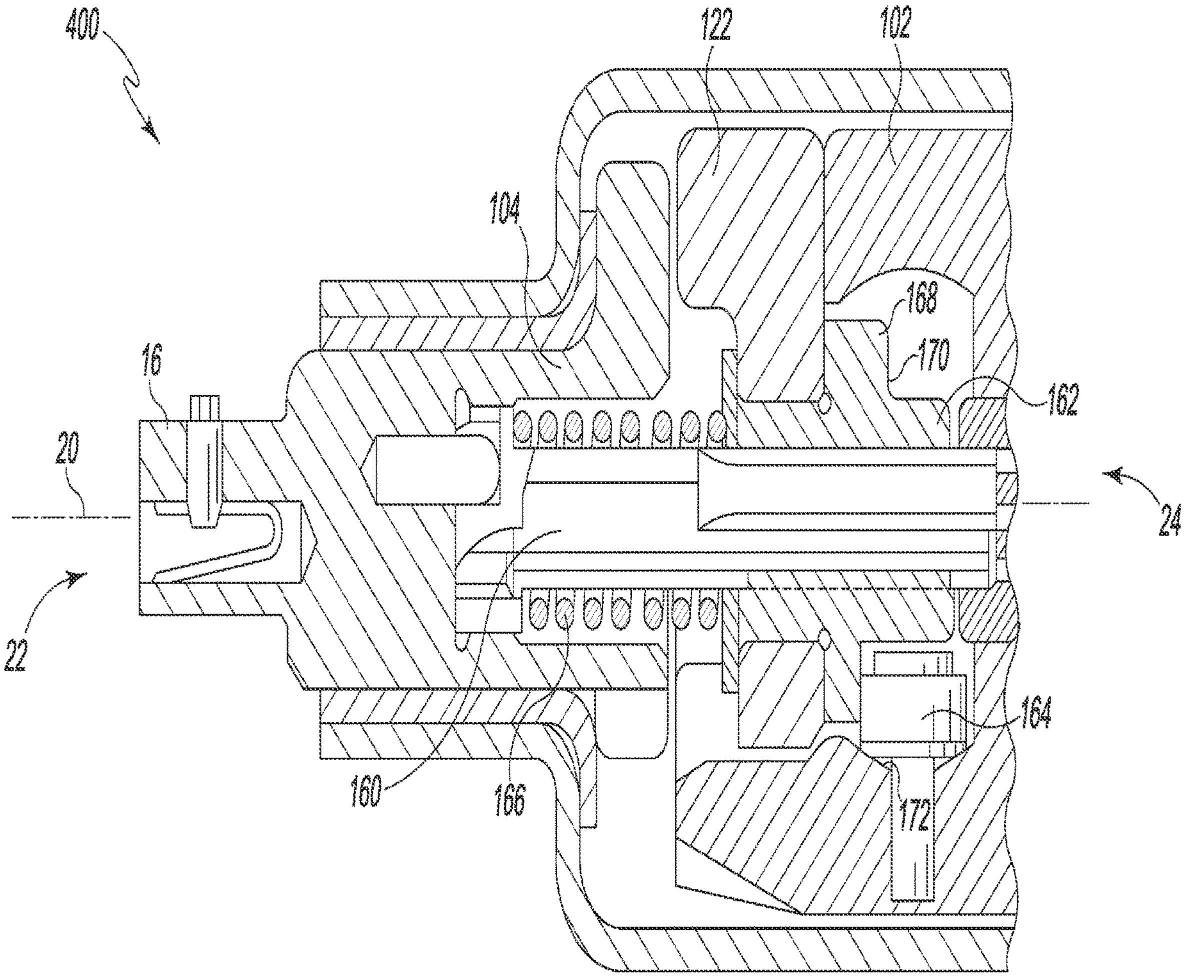
FIG. 9 is a side elevation cross-sectional view of a further illustrative embodiment of an impact mechanism that may be used with the impact tool of FIG. 1.

Referring now to FIG. 9, still another embodiment of an impact mechanism 400 that may be used with impact tool 10 is shown. In particular, FIG. 9 illustrates a side elevation cross-section of an impact mechanism 400 similar to a "ski jump" type impact mechanism. Unlike impact mechanisms 100, 200, 300, impact mechanism 400 is not a swinging weight style impact mechanism. Instead, hammer 102 of illustrative impact mechanism 400 is rigidly coupled directly to rotor 26 of electric motor 12 for rotation therewith. As shown, illustrative impact mechanism 400 includes a hammer 102, an anvil 104, a shaft 160, a cam 162, a cam follower 164, and a spring 166.

As shown in FIG. 9, various components of impact mechanism 400 are disposed along axis 20 for rotation about and/or movement along axis 20. In the illustrative embodiment, shaft 160 is disposed along axis 20 and has a splined, keyed, or other geometry configured to allow cam 162 to move along axis 20 and to prevent cam 162 from rotating about shaft 160. Spring 166 biases cam 162 along axis 20 away from anvil 104 (i.e., toward rear end 24 of impact tool 10). As shown in the illustrative embodiment, cam follower 164 is secured to an inner wall 172 of hammer 102 and therefore configured for rotation therewith. Further, cam 162 includes an angled protrusion 168 (e.g., a triangular or "ski jump" shaped protrusion) along a face 170 of cam 162 configured to contact cam follower 164. As such, during operation, hammer 102 rotates about axis 20 such that cam follower 164 moves along the cam face 170. While rotating, cam follower 164 moves up angled protrusion 168 and, due to the sudden rise, thrusts the hammer jaw 118 forward toward anvil 104 so that a rotational blow is struck as described above. Spring 166 disengages the hammer jaw 118 from anvil 104 and the process repeats. It will be appreciated that a "pin style" impact mechanism operates in a similar manner; however, in such embodiments, one or more pins (e.g., analogous to hammer jaws) are thrust forward rather than a portion of hammer 102 itself.

Again, it will be appreciated by the skilled artisan upon reading this disclosure that although these impact mechanism-types exist for use with air motor-type impact tools, they have not previously been used on electric motor driven impact tools for the reasons previously discussed. Indeed, these types of directly coupled and driven impact mechanisms can damage a conventional electric impact tool mechanism scheme. Hammer rebounding would cause the current delivered to the electric motor to surge. In the context of this present disclosure, the ability of the current to be limited by one of various mechanisms such as those described above allow the rotor to reverse direction without creating a significant surge or allowing the current to remain above a critical level for too long.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. For example, while impact mechanism 14 has been illustratively shown and described as including one hammer 102, it will be appreciated that the concepts of the present disclosure might also be applied to impact mechanisms including two or more hammers.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

What is claimed is:

1. An impact tool comprising:
an impact mechanism comprising a hammer and an anvil, the hammer configured to rotate about a first axis and to periodically impact the anvil to drive rotation of the anvil about the first axis; and
an electric motor comprising:
a rotor configured to be directly coupled to the impact mechanism, the rotor having a first end, a second end, and a non-cylindrical outer surface,
rotor laminations, each of the rotor laminations comprising a disk having a central aperture defined therein, the central aperture having a non-cylindrical inner perimeter corresponding to and configured to engage the non-cylindrical outer surface of the rotor to form a non-slip joint configured to prevent slip between the rotor and the rotor laminations, the electric motor configured to drive rotation of the hammer about the first axis; and
a control circuit configured to control a current supplied to the electric motor, the control circuit including a modulation circuit configured to modulate the current and a current measurement circuit configured to measure successive modulation cycles of the current and to disable the current to the electric motor for the remainder of a modulation cycle when the current exceeds a specified threshold;
wherein the motor rotates the hammer in a first direction, and the hammer causes the rotor to periodically stop rotating in the first direction when the hammer periodically impacts the anvil.

2. The impact tool of claim 1, wherein the electric motor is one of a switch reluctance motor or a synchronous reluctance motor.

3. The impact tool of claim 2, wherein the non-slip joint is one of a D-shaped joint, a star joint, a hex joint, or a splined joint.

4. The impact tool of claim 1, wherein the control circuit limits the current supplied to the electric motor in response to the hammer impacting the anvil.

5. The impact tool of claim 1, wherein the modulation circuit comprises a pulse-width modulation circuit.

6. The impact tool of claim 1, wherein the control circuit comprises an electronic controller to determine a desired parameter of the impact mechanism and to adjust the threshold to a level associated with achieving the desired parameter of the impact mechanism.

7. The impact tool of claim 6, wherein the desired parameter is at least one of a rotational speed achieved by the hammer, a torque delivered by the hammer to the anvil upon impact, a rebound angle of the hammer after impacting the anvil, or a frequency at which the hammer impacts the anvil.

8. An impact tool comprising:
an impact mechanism comprising a hammer and an anvil, the hammer configured to rotate about a first axis and to periodically impact the anvil to drive rotation of the anvil about the first axis; and
an electric motor comprising:
a rotor configured to be directly coupled to the impact mechanism, the rotor having a first end, a second end, and defining an outer surface having a plurality of splines,
rotor laminations, each of the rotor laminations comprising a disk including a central aperture having an inner perimeter, the inner perimeter having a plurality of splines corresponding to and configured to engage the plurality of splines of the outer surface of the rotor to form a splined non-slip joint configured to prevent slipping between the rotor and the rotor laminations, the electric motor configured to drive rotation of the hammer about the first axis; and a control circuit configured to control a current supplied to the electric motor, the control circuit including a modulation circuit configured to modulate the current and a current measurement circuit configured to measure successive modulation cycles of the current and to disable the current to the electric motor for the remainder of a modulation cycle when the current exceeds a specified threshold;

wherein the motor rotates the hammer in a first direction, and the hammer causes the rotor to periodically stop rotating in the first direction when the hammer periodically impacts the anvil.

9. The impact tool of claim 8, wherein the control circuit limits the current supplied to the electric motor in response to the hammer impacting the anvil.

10. The impact tool of claim 8, wherein the modulation circuit comprises a pulse-width modulation circuit.

11. The impact tool of claim 9, wherein the control circuit comprises an electronic controller to determine a desired parameter of the impact mechanism and to adjust the threshold to a level associated with achieving the desired parameter of the impact mechanism.

12. The impact tool of claim 11, wherein the desired parameter is at least one of a rotational speed achieved by the hammer, a torque delivered by the hammer to the anvil upon impact, a rebound angle of the hammer after impacting the anvil, or a frequency at which the hammer impacts the anvil.

13. The impact tool of claim 8, wherein the electric motor is one of a switch reluctance motor or a synchronous reluctance motor.

14. An electric motor for a power tool, the electric motor comprising:

a rotor configured to be directly coupled to an impact mechanism of the power tool, the rotor having a first end, a second end, and a non-cylindrical outer surface, rotor laminations, each of the rotor laminations comprising a disk having a central aperture defined therein, the central aperture having a non-cylindrical inner perimeter corresponding to and configured to engage the non-cylindrical outer surface of the rotor to form a non-slip joint configured to prevent slip between the rotor and the rotor laminations, the electric motor configured to drive rotation of the impact mechanism about a first axis and a control circuit configured to control a current supplied to the electric motor, the control circuit including a modulation circuit configured to modulate the current and a current measurement circuit configured to measure successive modulation cycles of the current and to disable the current to the electric motor for the remainder of a modulation cycle when the current exceeds a specified threshold.

15. The electric motor of claim 14, wherein the electric motor is one of a switch reluctance motor or a synchronous reluctance motor.

16. The electric motor of claim 15, wherein the non-slip joint is one of a D-shaped joint, a star joint, a hex joint, or a splined joint.

17. The impact tool of claim 14, wherein the modulation circuit comprises a pulse-width modulation circuit.

18. The impact tool of claim 14, wherein the control circuit comprises an electronic controller to determine a desired parameter of the impact mechanism and to adjust the threshold to a level associated with achieving the desired parameter of the impact mechanism.

* * * * *